United States Patent
Junttila et al.

(10) Patent No.: US 11,894,892 B2
(45) Date of Patent: Feb. 6, 2024

(54) BEAMFORMING ANTENNAS THAT SHARE RADIO PORTS ACROSS MULTIPLE COLUMNS

(71) Applicant: CommScope Technologies LLC, Hickory, NC (US)

(72) Inventors: Mikko Junttila, Oulu (FI); Hangsheng Wen, Suzhou (CN); Ligang Wu, Suzhou (CN); Björn Lindmark, Sollentuna (SE); XiaoHua Hou, Richardson, TX (US); Martin L. Zimmerman, Chicago, IL (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 17/567,934

(22) Filed: Jan. 4, 2022

(65) Prior Publication Data
US 2022/0131578 A1   Apr. 28, 2022

Related U.S. Application Data

(63) Continuation-in-part of application No. 17/149,187, filed on Jan. 14, 2021, which is a continuation-in-part of application No. PCT/CN2020/111926, filed on Aug. 27, 2020.

(51) Int. Cl.
*H04B 7/0452* (2017.01)
(52) U.S. Cl.
CPC .................. *H04B 7/0452* (2013.01)
(58) Field of Classification Search
CPC ...... H04B 7/0452; H04B 7/10; H04B 7/0617; H01Q 1/246; H01Q 3/40; H01Q 21/24; H01Q 21/28; H01Q 25/001; H01Q 21/061; H01Q 23/00

USPC .......................................................... 375/267
See application file for complete search history.

(56) References Cited

U.S. PATENT DOCUMENTS

| | | | |
|---|---|---|---|
| 8,599,955 B1 | 12/2013 | Kludt et al. | |
| 8,619,927 B2 | 12/2013 | Kludt et al. | |
| 8,654,883 B2 | 2/2014 | Harel et al. | |
| 8,837,650 B2 | 9/2014 | Kludt et al. | |

(Continued)

FOREIGN PATENT DOCUMENTS

| | | |
|---|---|---|
| CN | 1553725 A | 12/2004 |
| CN | 102916735 A | 2/2013 |

(Continued)

OTHER PUBLICATIONS

Notification of Transmittal of the International Search Report and the Written Opinion of the International Searching Authority, or the Declaration, in corresponding PCT Application No. PCT/CN2020/111926 (dated May 26, 2021).

(Continued)

*Primary Examiner* — Fitwi Y Hailegiorgis
(74) *Attorney, Agent, or Firm* — Myers Bigel, P.A.

(57) ABSTRACT

Antenna systems are provided. An antenna system includes a beamforming array having a plurality of vertical columns of radiating elements that are each configured to transmit at least three antenna beams per polarization. Moreover, the antenna system includes a beamforming radio having a plurality of radio frequency ports per polarization that are coupled to and fewer than the vertical columns.

25 Claims, 30 Drawing Sheets

(56) References Cited

U.S. PATENT DOCUMENTS

| | | |
|---|---|---|
| 8,842,765 B2 | 9/2014 | Kludt et al. |
| 8,861,635 B2 | 10/2014 | Wang et al. |
| 9,344,168 B2 | 5/2016 | Abreu et al. |
| 2007/0205955 A1 | 9/2007 | Korisch et al. |
| 2012/0212372 A1 | 8/2012 | Petersson et al. |
| 2012/0319900 A1* | 12/2012 | Johansson ............. H01Q 21/26 342/368 |
| 2013/0044650 A1 | 2/2013 | Barker et al. |
| 2013/0319900 A1* | 12/2013 | Fowler ............... B65D 21/0231 206/509 |
| 2014/0347248 A1 | 11/2014 | Stjernman |
| 2015/0195001 A1 | 7/2015 | Barker et al. |
| 2016/0065290 A1* | 3/2016 | Zhu ...................... H04W 76/14 370/329 |
| 2019/0334636 A1* | 10/2019 | Li .......................... G01R 29/10 |
| 2020/0044345 A1 | 2/2020 | Zimmerman |

FOREIGN PATENT DOCUMENTS

| | | |
|---|---|---|
| WO | 2011120090 A1 | 10/2011 |
| WO | 2020243885 A1 | 12/2020 |

OTHER PUBLICATIONS

"Extended European Search Report dated Mar. 23, 2023, issued in corresponding European Application No. 20946540.0, pp. 7".
"Partial European Search Report in Corresponding Application No. 22215582.2, datd May 4, 2023, 11 pages".
"Indian Examination Report in Corresponding Patent Application No. 202246000412, dated Jun. 7, 2023, 6 pages".
"European Search Report in Corresponding Application No. 22215582.2, dated Aug. 4, 2023, 10 pages".

* cited by examiner

| COLUMN ATTRIBUTE | 1 | 2 | 3 | 4 |
|---|---|---|---|---|
| AMPLITUDE (dB) | 0 | 0 | 0 | 0 |
| PHASE | A | B | C | D |
| BEAM 1 | A= -405 | B= -270 | C= -135 | D= 0 |
| BEAM 2 | A= -135 | B= -90 | C= -45 | D= 0 |
| BEAM 3 | A= 135 | B= 90 | C= 45 | D= 0 |
| BEAM 4 | A= 405 | B= 270 | C= 135 | D= 0 |
| BROADCAST | A= 0 | B= -90 | C= -90 | D= 0 |

| COLUMN ATTRIBUTE | 1 | 2 | 3 | 4 | 5 | 6 |
|---|---|---|---|---|---|---|
| AMPLITUDE (dB) | -4.76 | -1.76 | 0 | 0 | -1.76 | -4.76 |
| PHASE | D +/- 180 | A | B | C | D | A +/- 180 |
| BEAM 1 | -540 | -405 | -270 | -135 | 0 | 135 |
| BEAM 2 | -180 | -135 | -90 | -45 | 0 | 45 |
| BEAM 3 | 180 | 135 | 90 | 45 | 0 | -45 |
| BEAM 4 | 540 | 405 | 270 | 135 | 0 | -135 |
| BROADCAST | -180 | 0 | -90 | -90 | 0 | -180 |

| COLUMN / ATTRIBUTE | 1 | 2 | 3 | 4 | 5 | 6 | 7 | 8 |
|---|---|---|---|---|---|---|---|---|
| AMPLITUDE (dB) | -1 | -1 | -1 | -1 | -7 | -7 | -7 | -7 |
| PHASE | A | B | C | D | A +/-180 | B +/-180 | C +/-180 | D +/-180 |
| BEAM 1 | 0 | 130 | 260 | 405 | 540 | B +/-180 | C +/-180 | D +/-180 |
| BEAM 2 | 0 | 60 | 100 | 140 | 180 | B +/-180 | C +/-180 | D +/-180 |
| BEAM 3 | 0 | -60 | -100 | -140 | -180 | B +/-180 | C +/-180 | D +/-180 |
| BEAM 4 | 0 | -130 | -260 | -405 | -540 | B +/-180 | C +/-180 | D +/-180 |

FIG. 3C

| COLUMN / ATTRIBUTE | 1 | 2 | 3 | 4 | 5 | 6 | 7 | 8 |
|---|---|---|---|---|---|---|---|---|
| AMPLITUDE (dB) | -10.4 | -10.4 → -4.76 | -0.4 → -1.76 | -0.4 | -0.4 | -0.4 → -1.76 | -10.4 → -4.76 | -10.4 |
| PHASE | C +/- 180 | D +/- 180 | A | B | C | D | A +/- 180 | B +/- 180 |
| BEAM 1 | -270 | -135 | 0 | 135 | 270 | 405 | 540 | 675 |
| BEAM 2 | -90 | -45 | 0 | 45 | 90 | 135 | 180 | 225 |
| BEAM 3 | 90 | 45 | 0 | -45 | -90 | -135 | -180 | -225 |
| BEAM 4 | 270 | 135 | 0 | -135 | -270 | -405 | -540 | -675 |

FIG. 3E

| COLUMN / ATTRIBUTE | 1 | 2 | 3 | 4 | 5 | 6 | 7 | 8 |
|---|---|---|---|---|---|---|---|---|
| AMPLITUDE (dB) | -3 | -3 | -3 | 0 | 0 | -3 | -3 | -3 |
| PHASE | A | B | C | D | E | A | B | C |
| BEAM 1 | 0 | 144 | 288 | 432 | 576 | 0 | 144 | 288 |
| BEAM 2 | 0 | 72 | 144 | 216 | 288 | 0 | 72 | 144 |
| BEAM 3 | 0 | 0 | 0 | 0 | 0 | 0 | 0 | 0 |
| BEAM 4 | 0 | -72 | -144 | -216 | -288 | 0 | -72 | -144 |
| BEAM 5 | 0 | -144 | -288 | -432 | -576 | 0 | -144 | -288 |

FIG. 4C

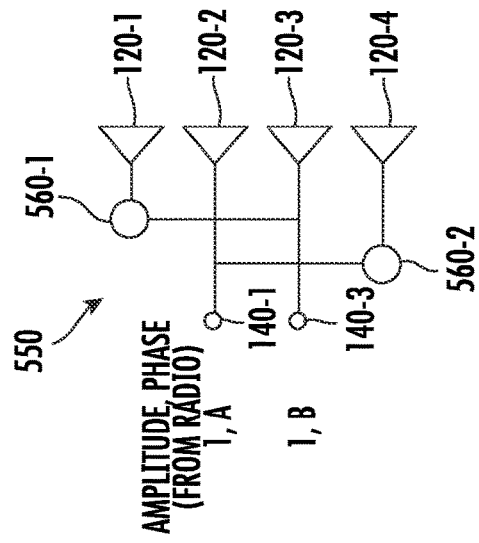
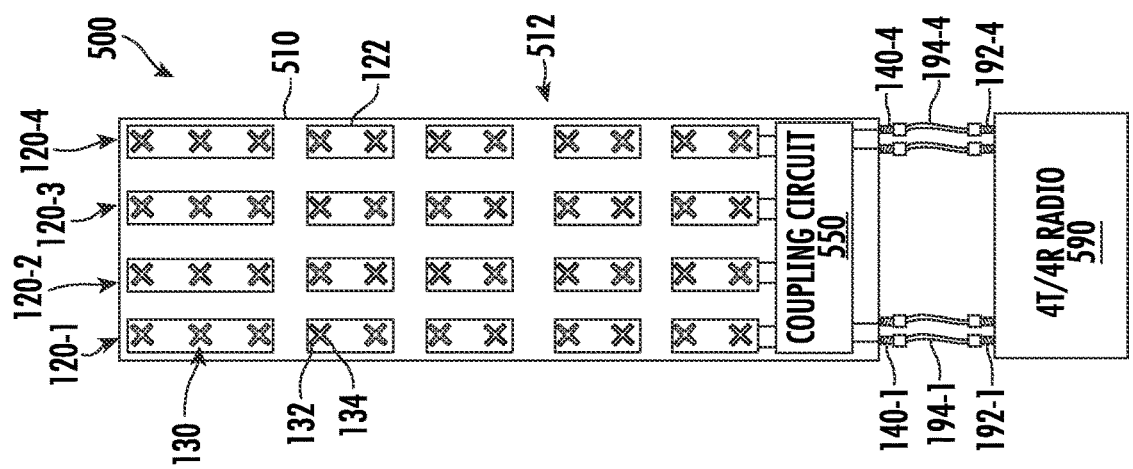

BEAMFORMING ANTENNAS THAT SHARE RADIO PORTS ACROSS MULTIPLE COLUMNS

CROSS-REFERENCE TO RELATED APPLICATIONS

The present application is a continuation-in-part of U.S. patent application Ser. No. 17/149,187, filed on Jan. 14, 2021, which itself claims priority to PCT Application No. PCT/CN2020/111926, filed Aug. 27, 2020, the entire content of which is incorporated herein by reference.

BACKGROUND

The present invention generally relates to radio communications and, more particularly, to beamforming base station antennas for cellular communications systems.

Cellular communications systems are well known in the art. In a cellular communications system, a geographic area is divided into a series of regions or "cells" that are served by respective base stations. Each base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more base station antennas that have an azimuth Half Power Beamwidth ("HPBW") of approximately 65°. Typically, the base station antennas are mounted on a tower or other raised structure, with the radiation patterns that are generated by the base station antennas directed outwardly. Base station antennas are often implemented as linear or planar phased arrays of radiating elements.

In order to increase capacity, base station antennas that include beamforming arrays and/or that are configured to operate with multi-input-multi-output ("MIMO") radios have been introduced in recent years. A beamforming array refers to an antenna array that includes multiple columns of radiating elements. Beamforming arrays can generate antenna beams having reduced (narrower) beamwidths in, for example, the horizontal or "azimuth" plane, which increases the directivity or "gain" of the antenna, thereby increasing the supportable throughput. MIMO refers to a communication technique in which a data stream is broken into pieces that are simultaneously transmitted using certain coding techniques over multiple relatively uncorrelated transmission paths between a transmitting station and a receiving station. Multi-column antenna arrays may be used for MIMO transmissions, where each column in the array may be connected to a port of a MIMO radio and used to transmit/receive one of the multiple data streams. In practice, since orthogonal polarizations tend to be highly uncorrelated, the radiating elements in a MIMO array are typically implemented as dual-polarized radiating elements, allowing each column in the MIMO array to be connected to two ports on the radio (where the first port is connected to the first polarization radiators of the radiating elements in the column, and the second port connected to the second polarization radiators of the radiating elements in the column). This technique can effectively halve the number of columns of radiating elements required, since each physical column of the array contains two independent columns of radiators.

MIMO and beamforming techniques can also be combined. For example, so-called 8-Transmit/8-Receive ("8T8R") radios (which include eight radio ports) are now routinely connected to antenna arrays that include four columns of dual-polarized radiating elements that are configured to form a single antenna beam per polarization within a sector. The two polarizations may be used to implement 2×MIMO communications for each antenna beam. These beamforming antennas are typically used for time division duplex ("TDD") communications and may generate a single antenna beam during each individual time slot of the TDD communication scheme. Likewise, 16-Transmit/16-Receive ("16T16R") radios (which include sixteen radio ports) are known in the art that are connected to antenna arrays that include eight columns of dual-polarized radiating elements that are configured to form a single antenna beam at a time within a sector. The 16T16R solutions provide higher gain and less interference (and hence support higher data throughput) as compared to the 8T8R solution, but also require a larger array on the antenna and a much more expensive 16T16R radio, which can significantly increase cost.

SUMMARY

Pursuant to embodiments of the present invention, an antenna system may include a beamforming radio having a plurality of first polarization signal sources and a plurality of first polarization radio signal ports, where each first polarization signal source is coupled to all of the first polarization radio signal ports. The antenna system may include an antenna array having a plurality of columns of radiating elements. Moreover, the antenna system may include a coupling circuit that includes a coupler and/or splitter that connects one of the first polarization radio signal ports to at least two of the columns of radiating elements. For example, the splitter may be an RF power divider that connects the one of the first polarization radio signal ports to the at least two of the columns of radiating elements.

In some embodiments, a total number of the first polarization signal sources may be equal to a total number of the first polarization radio signal ports. Moreover, the coupling circuit may include another coupler and/or splitter that connects the one of the first polarization radio signal ports to at least two rows of the radiating elements.

According to some embodiments, the beamforming radio may include a total of X first polarization radio signal ports and the antenna array may include a total of Y columns of radiating elements, where X and Y are positive integers and Y is greater than X. For example, Y may be equal to 2*X. Moreover, a total number of couplers and/or splitters included in the coupling circuit that connect the first polarization radio signal ports to the columns of radiating elements in the antenna array may be equal to Y−X, and the coupler and/or splitter may connect the one of the first polarization radio signal ports to fewer than all of the columns of radiating elements.

In some embodiments, each first polarization signal source may be coupled to all of the columns of radiating elements. Moreover, the splitters may be RF power dividers that couple the Z first polarization antenna signal ports to the Y columns of radiating elements.

According to some embodiments, the coupling circuit may include a plurality of couplers and/or splitters that connect the first polarization radio signal ports to the columns of radiating elements in the antenna array. Moreover, the antenna system may include a plurality of first polarization antenna signal ports and a Butler Matrix beamforming network that is connected between the first polarization antenna signal ports and the coupling circuit.

Each coupler and/or splitter in the coupling circuit may, in some embodiments, only be coupled to two of the columns of radiating elements. Moreover, each coupler in the coupling circuit may be a four-port coupler having an input port that is coupled to a respective one of the first polarization radio signal ports, first and second output ports that are coupled to respective ones of the columns of radiating elements, and an isolation port that is coupled to a resistive termination.

In some embodiments, a hook balun of a radiating element in a first of the columns is flipped as compared to a hook balun of a radiating element in a second of the columns.

An antenna system, according to embodiments of the present invention, may include a beamforming radio having W first polarization signal sources and X first polarization radio signal ports, where W and X are positive integers, and where each first polarization signal source is coupled to all X of the first polarization radio signal ports. The antenna system may include an antenna including: an antenna array having Y columns of radiating elements, where Y is a positive integer that is greater than X; and Z first polarization antenna signal ports that are coupled to the antenna array, where Z is a positive integer. Moreover, the antenna system may include a coupling circuit that includes a plurality of couplers and/or splitters, the coupling circuit coupling the Z first polarization antenna signal ports to the Y columns of radiating elements.

In some embodiments, a total number of couplers and/or splitters included in the coupling circuit that couple the Z first polarization antenna signal ports to the Y columns of radiating elements in the antenna array may be equal to Y−Z.

According to some embodiments, each first polarization signal source may be coupled to all Y columns of radiating elements.

In some embodiments, each coupler and/or splitter in the coupling circuit may only be coupled to two of the columns of radiating elements.

According to some embodiments, each coupler in the coupling circuit may be a four-port coupler having an input port that is coupled to a respective one of the first polarization radio signal ports, first and second output ports that are coupled to respective ones of the columns of radiating elements, and an isolation port that is coupled to a resistive termination.

In some embodiments, W may be equal to X.

According to some embodiments, Z may be less than Y.

In some embodiments, the antenna system may include a Butler Matrix beamforming network that is connected between the Z first polarization antenna signal ports and the coupling circuit.

A base station antenna system, according to embodiments of the present invention, may include a beamforming array having a plurality of vertical columns of radiating elements that are each configured to transmit at least three antenna beams per polarization. Moreover, the base station antenna system may include a beamforming radio having a plurality of radio signal ports per polarization that are coupled to and fewer than the vertical columns. For example, the vertical columns may include at least five vertical columns, and the radio signal ports may include no more than eight radio signal ports that are coupled to the at least five vertical columns. In another example, the vertical columns may include at least five vertical columns, and the radio signal ports may include no more than six radio signal ports that are coupled to the at least five vertical columns. As a further example, the vertical columns may include at least six vertical columns, and the radio signal ports may include no more than ten radio signal ports that are coupled to the at least six vertical columns.

In some embodiments, the no more than ten radio signal ports of the beamforming radio may include no more than five radio signal ports per polarization that are coupled to the at least six vertical columns. Moreover, the beamforming radio may include a plurality of RF signal sources per polarization that are each coupled to all of the no more than five radio signal ports.

According to some embodiments, the base station antenna system may include analog RF circuitry that is coupled between the beamforming radio and two of the vertical columns.

In some embodiments, the analog RF circuitry may include an RF coupler and/or splitter. Also, the two vertical columns may be non-adjacent vertical columns, and RF outputs of the RF coupler and/or splitter may be coupled only to the non-adjacent vertical columns. Moreover, a first output of the RF coupler and/or splitter may be fed to a first of the vertical columns with a first phase, and a second output of the RF coupler and/or splitter may be fed to a second of the vertical columns with a second phase that is offset by 180 degrees from the first phase.

According to some embodiments, the beamforming array may be part of a base station antenna that includes a plurality of antenna signal ports. The base station antenna system may further include analog RF circuitry that is coupled between the beamforming radio and a pair of the vertical columns. The analog RF circuitry may be configured to couple an RF signal received at a first of the antenna signal ports to at least two of the vertical columns. For example, the analog RF circuitry may be inside the base station antenna. As another example, the analog RF circuitry may be external to the base station antenna.

In some embodiments, the analog RF circuitry may include an RF coupler and/or splitter that splits an RF signal input to the RF coupler and/or splitter from the first of the antenna signal ports into first and second sub-components. A first output of the RF coupler and/or splitter may be fed to a first of the vertical columns with a first phase, and a second output of the RF coupler and/or splitter may be fed to a second of the vertical columns with a second phase that is offset by 180 degrees from the first phase.

According to some embodiments, the beamforming radio may include at least four RF signal sources per polarization. Each of the at least four RF signal sources may be configured to generate a respective RF component of each of the at least three antenna beams. Moreover, the beamforming radio may be configured to control each of the at least four RF signal sources to individually turn on or off each of the at least three antenna beams.

An antenna system, according to some embodiments of the present invention, may include a beamforming radio having a plurality of first polarization signal sources and a plurality of first polarization radio signal ports, where each first polarization signal source is coupled to all of the first polarization radio signal ports. The antenna system may include an antenna array having a plurality of columns and a plurality of rows of radiating elements. Moreover, the antenna system may include a coupling circuit that includes a coupler and/or splitter that connects one of the first polarization radio signal ports to at least two of the rows of radiating elements. For example, the splitter may be an RF power divider that connects the one of the first polarization radio signal ports to the at least two of the rows of radiating elements.

A massive MIMO base station antenna system, according to some embodiments of the present invention, may include at least thirty-six groups, each of which includes a plurality of radiating elements. The massive MIMO base station antenna system may include a beamforming radio having fewer than sixty-four radio signal ports that are coupled to the antenna array. Moreover, the massive MIMO base station antenna system may include a coupling circuit that that couples a first of the radio signal ports to at least two of the groups.

In some embodiments, the beamforming radio may be a 32T32R beamforming radio.

According to some embodiments, each group may include exactly two radiating elements, and the antenna array may have at least six columns and at least six rows of the groups.

In some embodiments, each group may include exactly three radiating elements, and the antenna array may have eight columns and four rows of the groups.

According to some embodiments, a sub-array of the antenna array may include sixteen of the groups.

In some embodiments, a first row of the groups may include a first group of the sub-array and a second group that is outside of the sub-array. Moreover, the coupling circuit may couple the first group to the second group.

According to some embodiments, a first column of the groups may include a first group of the sub-array and a second group that is outside of the sub-array. Moreover, the coupling circuit may couple the first group to the second group.

In some embodiments, a first group of the sub-array may be in a first row and a first column of the groups. A second group that is outside of the sub-array may be in a second row and a second column of the groups. Moreover, the coupling circuit may couple the first group to the second group.

According to some embodiments, the coupling circuit may be an RF power divider.

In some embodiments, the coupling circuit may couple the first of the radio signal ports of the beamforming radio to multiple rows and multiple columns of the groups.

A base station antenna system, according to some embodiments, may include a beamforming radio having a plurality of radio signal ports. The base station antenna system may include an antenna array having a vertical stack of sub-arrays that each include a plurality of sub-columns of dual-polarized radiating elements. A first of the radio signal ports may be coupled to two sub-columns of a first of the sub-arrays. Moreover, a second of the radio signal ports may be coupled to two sub-columns of a second of the sub-arrays.

In some embodiments, each of the two sub-columns of the first of the sub-arrays may include three of the dual-polarized radiating elements. Moreover, each of the radio signal ports may be coupled to six of the dual-polarized radiating elements.

According to some embodiments, the first and the second of the sub-arrays may each be coupled to four of the radio signal ports per polarization.

In some embodiments, a third of the radio signal ports may be coupled to two sub-columns of a third of the sub-arrays. Moreover, a fourth of the radio signal ports may be coupled to two sub-columns of a fourth of the sub-arrays.

According to some embodiments, each of the two sub-columns of the first of the sub-arrays may include six of the dual-polarized radiating elements.

In some embodiments, the base station antenna system may include a plurality of first phase shifters per polarization that are coupled to the first of the sub-arrays. The base station antenna system may include a plurality of second phase shifters per polarization that are coupled to the second of the sub-arrays. The first of the radio signal ports may be coupled to the two sub-columns of the first of the sub-arrays via a first of the first phase shifters, and the second of the radio signal ports may be coupled to the two sub-columns of the second of the sub-arrays via a first of the second phase shifters. Moreover, the first of the sub-arrays may be coupled to four of the first phase shifters per polarization, and the second of the sub-arrays may be coupled to four of the second phase shifters per polarization.

According to some embodiments, the base station antenna system may include a single first phase shifter per polarization that is coupled to every sub-column of the first of the sub-arrays. Moreover, the base station antenna system may include a single second phase shifter per polarization that is coupled to every sub-column of the second of the sub-arrays.

A massive MIMO base station antenna system, according to some embodiments, may include an antenna array having a plurality of radiating elements. The massive MIMO base station antenna system may include a beamforming radio having fewer than sixty-four radio signal ports that are coupled to the antenna array. Moreover, the massive MIMO base station antenna system may include a coupling circuit that couples a first of the radio signal ports to at least two sub-columns of the radiating elements.

In some embodiments, the beamforming radio may be a 32T32R beamforming radio.

According to some embodiments, each sub-column may include exactly two radiating elements or exactly one radiating element. In other embodiments, each sub-column may include exactly three radiating elements, and the antenna array may have eight columns and four rows of the sub-columns.

In some embodiments, a sub-array of the antenna array may include eight of the sub-columns. Moreover, the coupling circuit may include a phase shifter.

A base station antenna system, according to some embodiments, may include a beamforming radio having a plurality of radio signal ports. The base station antenna system may include an antenna array having a plurality of rows and a plurality of columns of radiating elements. Each of the radio signal ports may be coupled to at least two of the columns and no more than half of the rows.

In some embodiments, each of the rows may be coupled to four of the radio signal ports per polarization, and each of the columns may include four sub-columns that are coupled to four of the radio signal ports, respectively, per polarization.

According to some embodiments, each of the radio signal ports may be coupled to one-quarter or one-third of the rows.

BRIEF DESCRIPTION OF THE DRAWINGS

FIG. 3C is a table illustrating the relative amplitudes and phases applied to the signals fed to the four columns of the antenna array of FIG. 3A via the coupling circuit of FIG. 3B in order generate eight antenna beams (four at each polarization).

FIG. 3E is a table illustrating the relative amplitudes and phases applied to the signals fed to the four columns of the antenna array of FIG. 3A via the coupling circuit of FIG. 3D in order generate eight antenna beams (four at each polarization).

FIG. 4C is a table illustrating the relative amplitudes and phases applied to the signals fed to the eight columns of the antenna array of FIG. 4A via the coupling circuit of FIG. 4B in order generate the ten antenna beams (five at each polarization).

FIG. 5A is a schematic front view of an antenna system according to embodiments of the present invention that includes a 4T4R radio, a coupling circuit, and an antenna array that includes four columns of dual-polarized radiating elements.

FIG. 5B is a schematic diagram illustrating a coupling circuit according to embodiments of the present invention that can be used to couple the 4T4R radio of FIG. 5A to the four-column antenna array of FIG. 5A.

FIG. 5C is a table illustrating the relative amplitudes and phases applied to the signals fed to the four columns of the antenna array of FIG. 5A via the coupling circuit that is shown in FIG. 5B in order generate four antenna beams (two at each polarization).

DETAILED DESCRIPTION

Pursuant to embodiments of the present invention, antenna systems (e.g., base station antenna systems) are provided that include antenna arrays that have multiple columns of radiating elements, where at least some of the columns are coupled to the same RF ports of a radio (herein "radio signal ports"). The radiating elements may be dual-polarized radiating elements so that the multi-column antenna array may generate multiple antenna beams at each polarization. In example embodiments, an eight-column (or six-column) antenna array may be fed by a radio that has fewer than eight (or fewer than six) radio signal ports per polarization. In particular, a coupling circuit that may include analog RF components, such as RF couplers and/or splitters, may couple at least some of the radio signal ports to respective pairs of columns of the antenna array. As a result, the radio may include fewer radio signal ports (per polarization) than there are columns of the antenna array. This allows the antenna systems according to embodiments of the present invention to provide improved antenna patterns and higher gains while using relatively inexpensive radios.

As discussed above, conventionally, 8T8R TDD beamforming radios are used in conjunction with antenna arrays having four columns of dual-polarized radiating elements. This implementation provides a relatively low cost beamforming solution, but may suffer from low gain (and hence low capacity) and relatively coarse antenna patterns that are not ideal. If higher performance is required, 16T16R TDD beamforming radios may be used in conjunction with antenna arrays having eight columns of dual-polarized radiating elements. This implementation provides increased gain, improved antenna beams and supports higher capacity, but may be significantly more expensive. Pursuant to embodiments of the present invention, antenna systems are provided that may, for example, include an 8T8R TDD beamforming radio in conjunction with antenna arrays having more than four columns of dual-polarized radiating elements (e.g., six columns or eight columns). This implementation provides increased gain and improved antenna beams as compared to the low cost solution discussed above, although not quite as good of performance as the high capacity solution. The antenna systems according to embodiments of the present invention thus may provide an intermediate solution that may be acceptable for many applications that previously required the high cost solution.

Embodiments of the present invention will now be discussed in greater detail with reference to the attached figures.

Figures 1A, 1B:
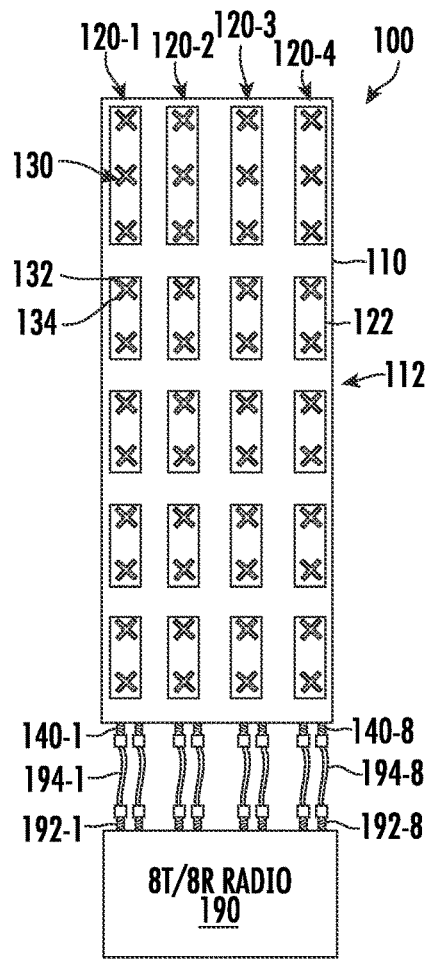
FIG. 1A is a schematic front view of a conventional antenna system that includes an 8T8R radio and an antenna array that includes four columns of dual-polarized radiating elements.
FIG. 1B is a table illustrating the relative amplitudes and phases applied to the signals fed to the four columns of the antenna array of FIG. 1A in order generate eight antenna beams (four at each polarization).

FIG. 1A is a schematic front view of a conventional antenna system 100 that includes an 8T8R radio 190 and an antenna 110 having an antenna array 112 that includes four columns 120-1 through 120-4 of dual-polarized radiating elements 130. Each radiating element 130 may comprise, for example, a crossed-dipole radiating element that includes a first dipole radiator 132 and a second dipole radiator 134 that crosses/intersects the first dipole radiator 132. The dipole radiators 132 and 134 each have two dipole "arms." Each column 120 includes one or more groups 122 (e.g., one or more sub-arrays) of radiating elements 130. Note that herein when multiple like elements are provided, they may be numbered using two-part reference numerals. These elements may be referred to individually by their full reference numeral (e.g., column 120-3), and may be referred to collectively by the first part of their reference numeral (e.g., the columns 120).

The array of columns 120 may be inside a radome of the antenna 110 (not shown). The antenna 110 may include RF ports 140-1 through 140-8, which may also be referred to herein as "connectors" or "antenna signal ports," that are coupled (e.g., electrically connected) to the columns 120. In particular, antenna signal ports 140-1, 140-3, 140-5 and 140-7 are coupled to the first radiators 132 of the radiating elements 130 of columns 120-1, 120-2, 120-3 and 120-4, respectively, and antenna signal ports 140-2, 140-4, 140-6 and 140-8 are coupled to the second radiators 134 of the radiating elements 130 of columns 120-1, 120-2, 120-3 and 120-4, respectively. As is further shown in FIG. 1A, the antenna signal ports 140 are also coupled to respective radio signal ports 192 of the radio 190 by respective RF transmission lines 194-1 through 194-8, such as coaxial cables. For example, the radio 190 may be a TDD beamforming radio for a cellular base station, and the antenna 110 and the radio 190 may be located at (e.g., may be components of) a cellular base station.

Because the radio 190 is shown as an 8T8R radio, it includes eight RF ports 192-1 through 192-8 that pass RF communication signals between the internal components of the radio 190 and the antenna array 112. These ports 192 may also be referred to herein as "radio signal ports." For example, four of the radio signal 192 may be first polarization ports and another four of the radio signal 192 may be second polarization ports, where the first and second polarizations are different polarizations. The radio 190 may also include one or more calibration ports (not shown) that are not radio signal ports, but instead are ports that may be used in calibrating the internal circuitry of the radio 190 to account for amplitude and phase differences between the RF signal paths external to the radio 190.

The 8T8R radio 190 includes four RF first polarization signal sources and four second polarization signal sources. Each first polarization RF signal source in radio 190 is coupled to the four first polarization radio signal ports (here radio signal ports 192-1, 192-3, 192-5, 192-7), and each second polarization RF signal source in radio 190 is coupled to the four second polarization radio signal ports (here radio signal ports 192-2, 192-4, 192-6, 192-8).

FIG. 1B is a table illustrating the relative amplitudes and phases applied to the RF signals fed to the four columns of the antenna array of FIG. 1A in order generate eight antenna beams (four at each polarization). The table of FIG. 1B only illustrates the relative amplitudes and phases of the RF signals fed to the first polarization radiators 132 of the columns 120. It will be appreciated that the same relative amplitudes and phases of the RF signals fed to the first polarization radiators 132 of the columns 120.

In FIG. 1B, the rows labeled "Beam X" (X=1, 2, 3, 4) show the relative phases of the four RF signals that are provided to the first radiators 123 of the radiating elements 130 in the four columns 120. Thus, for example, the first signal source (Beam 1) outputs a signal having a relative amplitude of 0 dB and a relative phase of −405 to the radiators 132 of the first column 120-1, outputs a signal having a relative amplitude of 0 dB and a relative phase of −270 to the radiators 132 of the second column 120-1, outputs a signal having a relative amplitude of 0 dB and a relative phase of −135 to the radiators 132 of the third column 120-3, and outputs a signal having a relative amplitude of 0 dB and a relative phase of 0 to the radiators 132 of the fourth column 120-4. The four RF signals output by the first signal source in radio 190 to the four columns 120-1 through 120-4 as described above generate a first antenna beam that points in a first direction in the azimuth plane. The second, third and fourth signal sources in radio 190 generate second, third and fourth antenna beams that point in three additional directions in the azimuth plane.

FIG. 1B also shows the phases that may be applied by the radio 190 in order to generate a so-called "broadcast" beam. As is known in the art, a broadcast beam refers to a beam that is formed by a beamforming antenna that is a wide beamwidth beam that is designed to cover the entire coverage area that is served by the antenna system. The broadcast beam is a single beam that is used to communicate with all users throughout the coverage area.

Figure 2A:
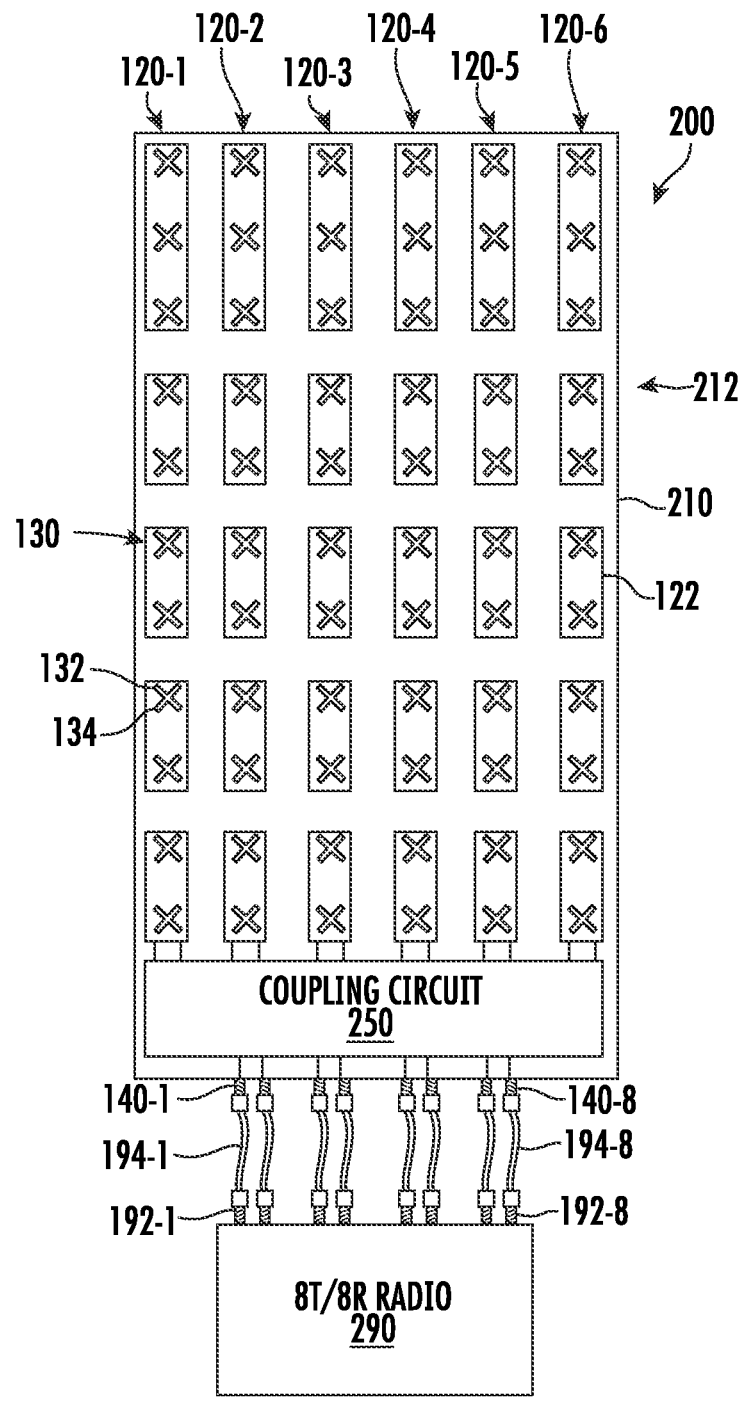
FIG. 2A is a schematic front view of an antenna system according to embodiments of the present invention that includes an 8T8R radio, a coupling circuit, and an antenna array that includes six columns of dual-polarized radiating elements.

FIG. 2A is a schematic front view of an antenna system 200 according to embodiments of the present invention that includes an 8T8R radio 290 (e.g., a TDD beamforming radio), a coupling circuit 250, and an antenna 210 having antenna array 212 that includes six columns 120-1 through 120-6 of dual-polarized radiating elements 130. It will be appreciated that the antenna system 200 may include additional columns of radiating elements (not shown).

The antenna 210 may include antenna signal ports 140 that are coupled to the columns 120. The antenna signal ports 140 are also coupled to respective radio signal ports 192 of the radio 290 by RF transmission lines 194. The radio 290 may be a TDD beamforming radio, and the antenna 210 and the radio 290 may be located at (e.g., may be components of) a cellular base station.

The columns 120 may be referred to herein as "vertical" columns, as they may extend in a vertical direction from a lower portion of the antenna 210 to an upper portion of the antenna 210. The vertical direction may be, or may be parallel with, a longitudinal axis of the antenna 210, which may be perpendicular to the horizon. As used herein, the term "vertical" does not necessarily require that something is exactly vertical (e.g., the antenna 210 may have a small mechanical down-tilt). Additionally, in the depicted embodiment, the radiating elements 132 are arranged in true rows and columns. It will be appreciated that in many cases every other column 120 may be offset in the vertical direction so that every column 120 is "staggered" in the vertical direction with respect to its one or more adjacent columns 120. This "staggered" approach may increase the distance between radiating elements 132 in adjacent columns 120 and hence improve the isolation between adjacent columns 120.

The coupling circuit 250 connects (e.g., electrically connects) the antenna signal ports 140 to the columns 120. Specifically, the coupling circuit 250 is configured to split an RF signal that is input to a first of the antenna signal ports 140 into two sub-components and to feed the two sub-components of this RF signal to the first polarization radiators 132 of the radiating elements 130 in respective first and second of the columns 120. The coupling circuit 250 is further configured to split an RF signal that is input to a second of the antenna signal ports 140 into two sub-components and to feed the two sub-components of this RF signal to the first polarization radiators 132 of the radiating elements 130 in respective third and fourth of the columns 120. The coupling circuit 250 is likewise configured to similarly split RF signals that are input to third and fourth of the antenna signal ports 140 into respective pairs of sub-components and to feed those sub-components to the second polarization radiators 130 of the radiating elements 130 in a similar fashion. The coupling circuit 250 may comprise various types of analog RF circuitry, such as a plurality of RF couplers and/or a plurality of RF splitters/combiners (e.g., RF power dividers). Though shown in FIG. 2A as being inside the antenna 210, the coupling circuit 250 may, in some embodiments, be external to the antenna 210. As an example, the coupling circuit 250 may be a standalone device that is coupled between (a) the radio signal ports 192 and (b) the antenna signal ports 140.

Because the radio 290 is shown as an 8T8R radio, it includes eight radio signal ports 192-1 through 192-8. Four of the radio signal ports 192 may be first polarization ports and another four of the radio signal ports 192 may be second polarization ports, where the first and second polarizations are different polarizations. As will be discussed below, other radios having different numbers of radio signal ports may be used in other embodiments. For example, in some embodiments, a 4T4R radio having four radio signal ports or a 10T10R radio having ten radio signal ports 192 (e.g., five first polarization radio signal ports and five second polarization radio signal ports) may be used instead of the 8T8R radio 290.

The number of columns 120 of dual-polarized radiating elements 130 included in antenna 210 exceeds the number of first polarization radio signal ports 192 included on radio 290. In order utilize all six columns 120 at both polarizations, at least some of the radio signal ports 192 are shared across multiple (here two) columns 120 using the coupling circuit 250. Thus, by providing the coupling circuit 250, the correspondence between the number of columns and the number of first (or second) polarization radio signal ports on the beamforming radio may be broken, and hence the antenna 210 may include five, six, seven, eight, or more columns 120, even though the radio 290 only has four radio signal ports 192 per polarization.

Butler Matrices have been used in the past to couple radio signal ports to a multi-column antenna array, where the number of radio signal ports per polarization did not necessarily equal the number of columns of radiating elements in the antenna array. However, such conventional techniques were used with multiple standard frequency division duplex ("FDD") radios to form multiple static antenna beams for sector-splitting operations. Each radio signal port was connected to a single signal source, and the Butler Matrix was used to split and phase shift the RF signals provided by each signal source so as to feed the RF signals to all of the columns in the antenna array. This typically required a series of layers of hybrid couplers or other analog circuit elements that could significantly increase the insertion loss of the antenna. Pursuant to embodiments of the present invention, beamforming radios may be used that feed combined signal sources in the digital domain so that each radio signal port may output sub-components of the RF signals generated by multiple signal sources. A small number of additional analog components (e.g., hybrid couplers or Wilkinson power dividers) may then be used to further sub-divide the RF signals output at one or more of the radio signal ports so that all of the columns 120 of the antenna array 212 are fed. In other words, the radio 290 may perform some beamforming RF signal operations in a digital domain, thereby simplifying antenna system hardware and improving insertion loss. For example, as will be discussed below with reference to FIG. 7B, in one example embodiment the radio 290 may include four RF signal sources 715 and may be configured to combine the RF signals generated by all four signal sources 715 before outputting the combined signal from a radio signal port 192. Each of the signal sources 715 may be coupled to all of the radio signal ports 192 and may be configured to generate a respective RF signal component 716 of each antenna beam that the columns 120 transmit, and the radio 290 may be configured to control each of the signal sources 715 to individually turn on or off each antenna beam.

Figures 2B, 2C:
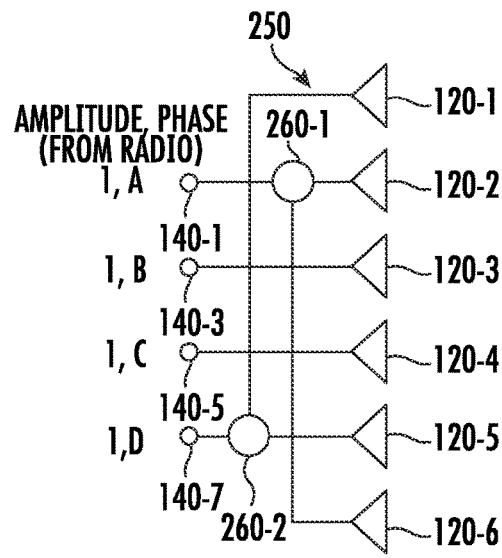
FIG. 2B is a schematic diagram illustrating a coupling circuit according to embodiments of the present invention that can be used to couple the 8T8R radio of FIG. 2A to the six-column antenna array of FIG. 2A.
FIG. 2C is a table illustrating the relative amplitudes and phases applied to the signals fed to the six columns of the antenna array of FIG. 2A in order generate eight antenna beams (four at each polarization).

Though the system 200 has only one radio 290, antenna systems according to other embodiments of the present invention may include multiple radios that are coupled to the same antenna array. For example, additional radios and diplexers could be provided to provide a frequency division duplex ("FDD") twin-beam or tri-beam or quad-beam antenna system that operated in a different sub-band of the operating frequency range of the radiating elements 130 so that the antenna array 212 may be used as a TDD beamforming array in the first sub-band and as an FDD sector splitting array in the second sub-band FIG. 2B is a schematic diagram illustrating a coupling circuit 250 according to embodiments of the present invention that can be used to couple the 8T8R radio 290 of FIG. 2A to the six-column antenna array 212 of FIG. 2A. As shown in FIG. 2B, the coupling circuit 250 may include first and second couplers and/or splitters 260-1 and 260-2. The first coupler and/or splitter 260-1 connects (e.g., electrically connects) a first antenna signal port 140-1 to both a second column 120-2 and a sixth column 120-6. Similarly, the second coupler and/or splitter 260-2 connects a seventh antenna signal port 140-7 to both a first column 120-1 and a fifth column 120-5.

The ports 140-1 and 140-7, as well as ports 140-3 and 140-5, may be first polarization ports. For simplicity of illustration, second polarization antenna signal ports 140-2, 140-4, 140-6, and 140-8 are omitted from view in FIG. 2B. An identical coupling circuit 250 may be used to couple the second polarization antenna signal ports 140-2, 140-4, 140-6, and 140-8 to the six columns 120-1 through 120-6 of antenna array 212. Moreover, in some embodiments, the coupling circuit 250 may be external to the antenna 210, and the couplers and/or splitters 260 may thus couple radio signal ports 192 to respective pairs of antenna signal ports 140.

The couplers and/or splitters 260-1 and 260-2 are coupled to respective non-adjacent pairs of columns 120. As used herein with respect to columns 120, the term "non-adjacent" refers to two columns 120 that have least one other column 120 therebetween. For example, FIG. 2B shows that each commonly-coupled pair has three columns 120 therebetween. Accordingly, the same distance can separate each commonly-coupled pair.

In some embodiments, the couplers and/or splitters 260-1 and 260-2 may be respective analog RF couplers. Herein, the term "coupling circuit" is used to cover a wide variety of power coupling and/or splitting devices, including four-port devices such as hybrid couplers, branch line couplers, rat race couplers, and the like, and three-port devices such as Wilkinson power couplers/dividers and the like.

Moreover, a coupling circuit according to other embodiments may include more than two couplers and/or splitters that are coupled to respective pairs of columns 120. In some embodiments, the total number of couplers and/or splitters (in a coupling circuit) that couple X first polarization antenna signal ports 192 to Y columns 120 (via Z first polarization antenna signal ports 140 (FIG. 2A) of an antenna) may be equal to Y−X and/or may be equal to Y−Z, where X, Y and Z are positive integers and Y is larger than both X and Z. In some embodiments, the total number of couplers and/or splitters may be equal to X. As a result, Y may equal 2*X in some embodiments and RF outputs of each coupler and/or splitter may thus be coupled to only (i.e., exactly) two columns 120. In other embodiments, a 4×4 Butler matrix may be used that includes 4 couplers that connect Z=4 ports 140 with Y=4, 6, or 8 columns 120.

In some embodiments, the radio 290 may include W first polarization signal sources that are each coupled to all of the X radio signal ports 192. Each first polarization signal source may also be coupled by the coupling circuit 250 to all of the Y columns 120 of the antenna array 212.

Each coupler and/or splitter 260 may, in some embodiments, be a four-port coupler having (i) an RF input port that is coupled to a respective one of the X radio signal ports 192, (ii) a first RF output port that is coupled to one of the Y columns 120, (iii) a second RF output port that is coupled to another of the Y columns 120, and (iv) an isolation port that is coupled to a resistive termination (e.g., a 50-Ohm resistor).

In some embodiments, the orientation of the hook baluns on the dipole radiators 132, 134 of the radiating elements 130 included in columns 120-1 and 120-6 may be reversed as compared to the orientation of the hook baluns on the dipole radiators 132, 134 of the radiating elements 130 included in columns 120-2 through 120-5. By reversing or "flipping" the hook baluns on dipole radiators 132, 134 of the radiating elements 130 (FIG. 2A), the phases of the RF signals fed to the radiating elements 130 of columns 120-1 and 120-6 may be shifted by 180 degrees relative to the phases of the RF signals fed to the radiating elements 130 of columns 120-2 and 120-5. Moreover, in some embodiments, the columns 120 may be spaced apart by about 0.5 wavelengths at the operating frequency (e.g., by at least 62 millimeters ("mm")).

The antenna system 200 may provide improved performance as compared to the conventional antenna system 100 of FIG. 1A. In particular, since the antenna array 212 includes six columns 120 of radiating elements (versus the four columns 120 included in antenna system 100) the gain of antenna array 212 may be approximately 0.4 dB greater than the gain of antenna array 112. Additionally, the antenna beams (e.g., at least three beams per polarization) generated by antenna array 212 may exhibit improved roll-off as compared to the antenna beams generated by antenna array 112.

FIG. 2C is a table illustrating the relative amplitudes and phases applied to the signals fed to the six columns of the beamforming antenna array of FIG. 2A in order generate eight antenna beams (four at each polarization). The table of FIG. 2C may be interpreted in the same fashion as described above with reference to the similar table of FIG. 1B. The amplitudes shown for columns 1, 2, 5, and 6 are merely examples. Accordingly, a different amplitude ratio can be provided between the couplers and/or splitters 260-1 and 260-2.

As shown in FIG. 2C, two columns 120 that are commonly coupled to a coupler and/or splitter 260 may transmit 180 degree phase-shifted versions of the same signal. For example, the fifth column 120-5 may transmit a signal having a phase "D" while the first column 120-1 may transmit an RF signal having a phase of D+/−180 degrees. Similarly the second column 120-2 may transmit a signal having a phase "A" while the sixth column 120-6 may transmit an RF signal having a phase of A+/−180 degrees.

These phase offsets, however, may not necessarily be exactly 180 degrees. In particular, the phase offsets can be adjusted via a phase shifter so that they are not exactly 180 degrees. This can allow different beamforming possibilities, and can avoid having sub-array patterns for coupled columns 120 that have local minima at given angles. More precisely, though the minima may still exist, control can be provided over where they occur.

Moreover, each antenna beam may be transmitted with a different respective phase for all of the columns 120. As an example, the RF signals fed to the six columns 120 to form the first antenna beam (Beam 1 in FIG. 2C) may have phases of −540 degrees, −405 degrees, −270 degrees, −135 degrees, 0, and +135 degrees at the columns 120-1 through 120-6, respectively. The phases do not, however, have to be in an arithmetic sequence and thus can be widely adjusted. Also, different antenna beams may be transmitted with different sets of phases for the columns 120, as is further shown in the table of FIG. 2C.

It should also be noted that the amplitudes of the signals are fed to the different columns 120. In particular, the RF signals fed to columns 120-3 and 120-4 may have a relative amplitude of 0 dB since these signals are not passed through a coupler and/or splitter. The couplers and/or splitters 260 may be implemented as four-port hybrid couplers, which may be assumed to have an insertion loss of, for example, 1 dB. The smaller signal output by each coupler and/or splitter 260 is fed to the outer column 120, and hence the signals fed to columns 120-1 and 120-6 may have relative amplitudes of −4.76 dB (i.e., an insertion loss of 1 dB and the coupler and/or splitter 260 reduces the magnitude of the signal by an additional 3.76 dB), and the signals fed to columns 120-2 and 120-5 may have relative amplitudes of −1.76 dB (i.e., an insertion loss of 1 dB and the coupler and/or splitter 260 reduces the magnitude of the signal by an additional 0.76 dB).

Each antenna beam (i.e., Beam 1 through Beam 4 in FIG. 2C) may provide coverage to a different portion of a 120 degree sector in some embodiments. Moreover, these antenna beams may be referred to herein as "switched" or "switchable" beams because they can be selectively transmitted to one or more particular sectors. For example, the beamforming radio 290 may generate only one antenna beam (e.g., Beam 1 or Beam 3, as two examples) during a first time slot of the TDD communication frame, and may generate more than one antenna beam during other time slots (e.g., two antenna beams, three antenna beams, or all four antenna beams).

In some embodiments, the antenna array 212 (or any of the other antenna arrays according to embodiments of the present invention that are described herein) may be designed to operate in multiple sub-bands of an operating frequency band of the radiating elements 130. For example, the radiating elements 130 may be designed to operate in the 2.2-2.7 GHz operating frequency band (or the 1.7-2.7 GHz operating frequency band). In such embodiments, the antenna array 212 may be designed to operate in either or both the 2.3 GHz sub-band or the 2.6 GHz sub-band, for example. In such an embodiment, the antenna array could be coupled to a 2.3 GHz TDD beamforming radio for operation in the 2.3 GHz sub-band, or could be coupled to a 2.6 GHz TDD beamforming radio for operation in the 2.6 GHz sub-band. Alternatively, diplexers could be used (which could be either internal to the antenna 210 or external to the antenna 210) that allow both a 2.3 GHz TDD beamforming radio and a 2.6 GHz TDD beamforming radio to simultaneously transmit and receive RF signals through the antenna array 212. In such embodiments, the spacing between adjacent columns may be selected so that the distance between adjacent columns is close to 0.5 wavelengths in both operating frequency bands. For example, a spacing of 62 mm between adjacent columns corresponds to 0.47 wavelengths at 2.3 GHz and to 0.54 wavelengths at 2.6 GHz, which represents a compromise in order to obtain good (but not ideal) performance in both sub-bands.

As is further shown in FIG. 2C, the antenna system 200 can also generate a broadcast beam that provides coverage to the full coverage area of the antenna 210. This broadcast beam may be used to, for example, transmit common control signals to all of the users within the coverage area of the antenna 210. It will be appreciated that each of the antenna systems according to embodiments of the present invention may be configured to generate such broadcast beams.

Figure 3A:
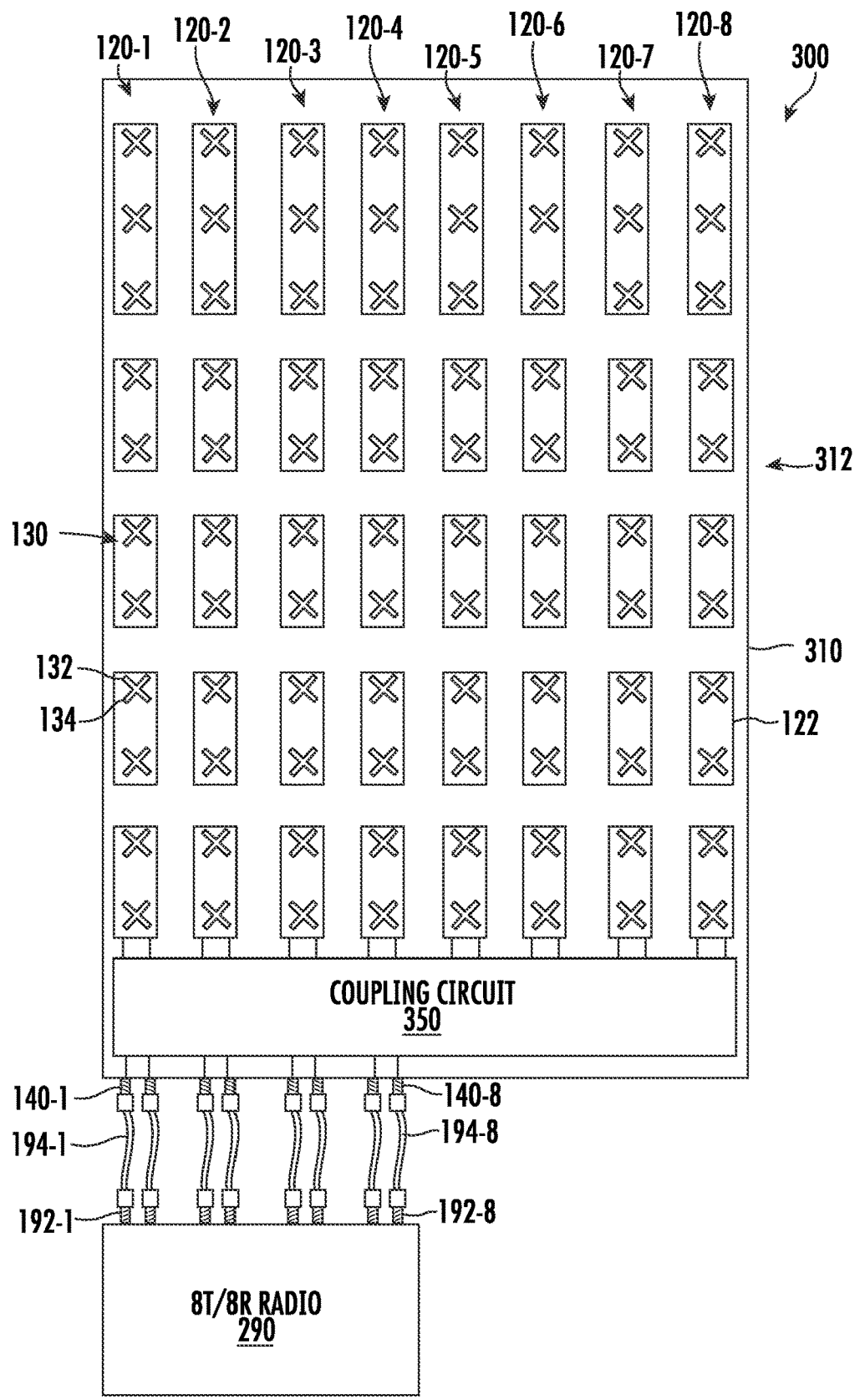
FIG. 3A is a schematic front view of an antenna system according to embodiments of the present invention that includes an 8T8R radio, a coupling circuit, and an antenna array that includes eight columns of dual-polarized radiating elements.

FIG. 3A is a schematic front view of an antenna system 300 according to embodiments of the present invention that includes an 8T8R radio 290, a coupling circuit 350, and an antenna 310 having an antenna array 312 that includes eight columns 120-1 through 120-8 of dual-polarized radiating elements 130. The antenna array 312 thus includes two more columns 120 than the antenna array 212 (FIG. 2A) and four more than the antenna array 112 (FIG. 1A). Accordingly, the coupling circuit 350 may include more couplers and/or splitters than the coupling circuit 250 (FIG. 2A). Moreover, to improve azimuth side lobes (e.g., by about 2-3 decibels ("dB")), one or more outer columns 120-1, 120-2, 120-7, and 120-8 may include fewer radiating elements 130 than inner columns 120-3 through 120-6.

Figure 3B:
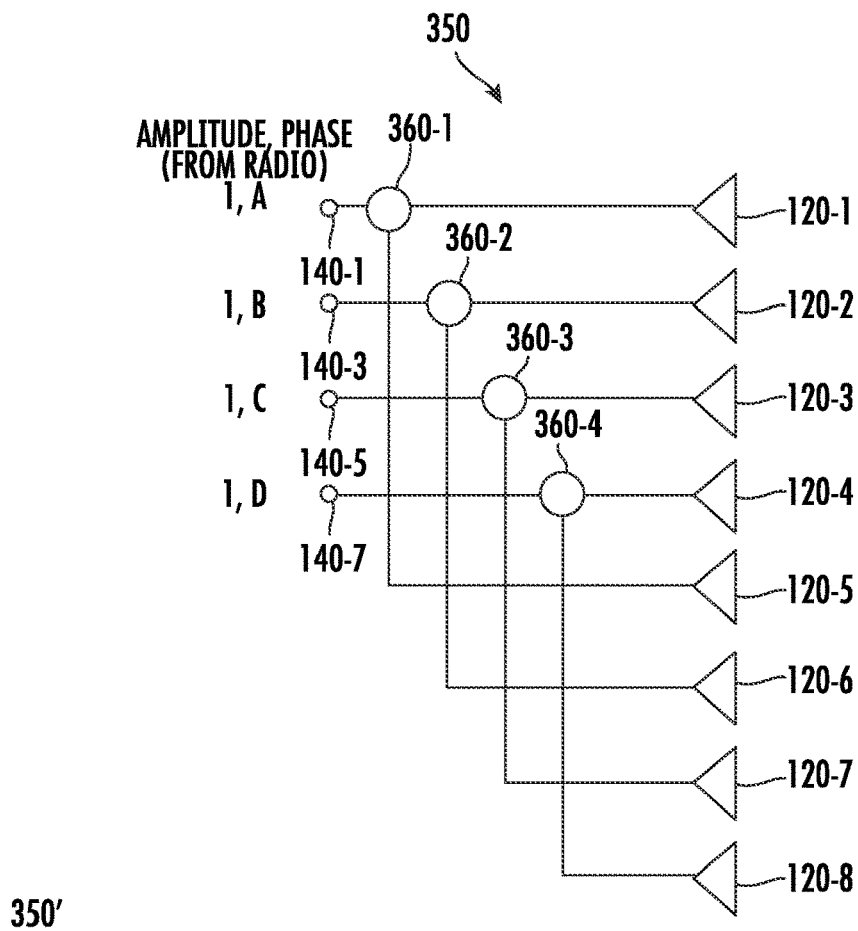
FIG. 3B is a schematic diagram illustrating a coupling circuit according to embodiments of the present invention that can be used to couple the 8T8R radio of FIG. 3A to the eight-column antenna array of FIG. 3A.

FIG. 3B is a schematic diagram illustrating a coupling circuit 350 according to embodiments of the present invention that can be used to couple the 8T8R radio 290 of FIG. 3A to the eight-column antenna array of FIG. 3A. The coupling circuit 350 may include four couplers and/or splitters 360-1 through 360-4. Each of the couplers and/or splitters 360 may electrically connect a respective radio signal port 192 of the radio 290 (via a respective antenna signal port 140 of the antenna 310) to a pair of columns 120.

The first coupler and/or splitter 360-1 connects a first antenna signal port 140-1 of the antenna 310 to both the first column 120-1 and the fifth column 120-5. The second coupler and/or splitter 360-2 connects a third antenna signal port 140-3 of the antenna 310 to both the second column 120-2 and the sixth column 120-6. The third coupler and/or splitter 360-3 connects a fifth antenna signal port 140-5 of the antenna 310 to both the third column 120-3 and the seventh column 120-7. Similarly, the fourth coupler and/or splitter 360-4 connects a seventh antenna signal port 140-7 of the antenna 310 to both the fourth column 120-4 and the eighth column 120-8. The antenna signal ports 140-1, 140-3, 140-5, and 140-7 may be first polarization ports. For simplicity of illustration, second polarization ports 140-2, 140-4, 140-6, and 140-8 are omitted from view in FIG. 3B. An identical circuit including another four couplers and/or splitters 360 may connect the second polarization ports 140-2, 140-4, 140-6, and 140-8 to the eight columns 120 of antenna array 212.

In some embodiments, the orientation of the hook baluns on the dipole radiators 132, 134 of the radiating elements 130 included in columns 120-5 through 120-8 may be reversed as compared to the orientation of the hook baluns on the dipole radiators 132, 134 of the radiating elements 130 included in columns 120-1 through 120-4, thus offsetting the phases of the signals fed to the four left-side columns 120 as compared to the four right-side columns 120 by 180 degrees. Moreover, the columns 120 may be spaced apart from each other by at least 62 mm in some embodiments.

FIG. 3C is a table illustrating the relative amplitudes and phases applied to the signals fed to the four columns 120 of the antenna array 312 of FIG. 3A via the coupling circuit 350 of FIG. 3B in order generate eight antenna beams (four at each polarization). The table of FIG. 3C may be interpreted in the same manner as the table of FIG. 1B, which is described in detail above. It will be appreciated that the amplitudes and phases shown in the table of FIG. 3C may be adjusted in order to "tune" the shapes of the generated antenna beams in order to meet customer requirements. The amplitudes shown are merely examples.

Figure 3D:
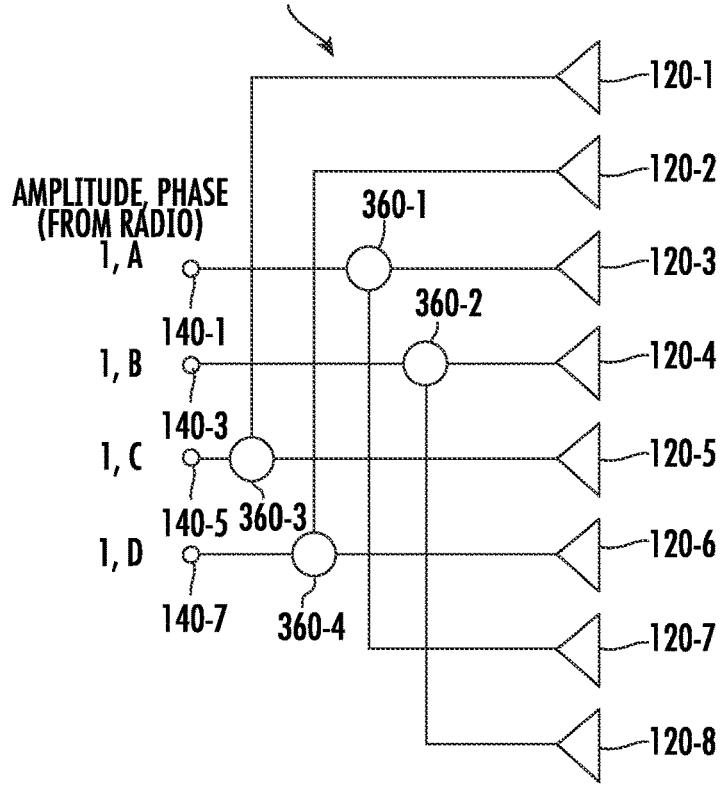
FIG. 3D is a schematic diagram illustrating another coupling circuit according to embodiments of the present invention that can be used to couple the 8T8R radio of FIG. 3A to the eight-column antenna array of FIG. 3A.

FIG. 3D is a schematic diagram illustrating another coupling circuit 350' according to embodiments of the present invention that can be used to couple the 8T8R radio 290 of FIG. 3A to the eight-column antenna array 312 of FIG. 3A. The first coupler and/or splitter 360-1 connects the first antenna signal port 140-1 of the antenna 310 to both the third column 120-3 and the seventh column 120-7. The second coupler and/or splitter 360-2 connects the third antenna signal port 140-3 to both the fourth column 120-4 and the eighth column 120-8. The third coupler and/or splitter 360-3 connects the fifth antenna signal port 140-5 to both the first column 120-1 and the fifth column 120-5. Similarly, the fourth coupler and/or splitter 360-4 connects the seventh antenna signal port 140-7 to both the second column 120-2 and the sixth column 120-6. Accordingly, as shown in FIGS. 3B and 3D, the couplers and/or splitters 360 can feed various combinations of non-adjacent columns 120.

In some embodiments, the orientation of the hook baluns on the dipole radiators 132, 134 of the radiating elements 130 included in columns 120-1, 120-2, 120-7 and 120-8 may be reversed as compared to the orientation of the hook baluns on the dipole radiators 132, 134 of the radiating elements 130 included in columns 120-3 through 120-6 in order to implement the phase shifts between the signals fed to various of the columns 120. Moreover, the columns 120 may be spaced apart from each other by at least 62 mm.

FIG. 3E is a table illustrating the relative amplitudes and phases applied to the signals fed to the four columns 120 of the antenna array 312 of FIG. 3A via the coupling circuit 350' of FIG. 3D in order generate eight antenna beams (four at each polarization). The table of FIG. 3E may be interpreted in the same manner as the table of FIG. 1B, which is described in detail above. It will be appreciated that the amplitudes and phases shown in the table of FIG. 3E may be adjusted in order to "tune" the shapes of the generated antenna beams in order to meet customer requirements.

In the table of FIG. 3E, the amplitudes for the RF signals fed to some of the columns are shown being within various ranges. For example, the amplitude of the RF signal fed to column 120-2 is shown as being in the range of −10.4 dB to −4.76 dB, and the amplitude of the RF signal fed to column 120-3 is shown as being in the range of −0.4 dB to −1.76 dB. This illustrates how couplers and/or splitters having different power division ratios may be used in order to fine tune the shapes of the antenna beams in order to meet customer requirements.

Figure 4A:
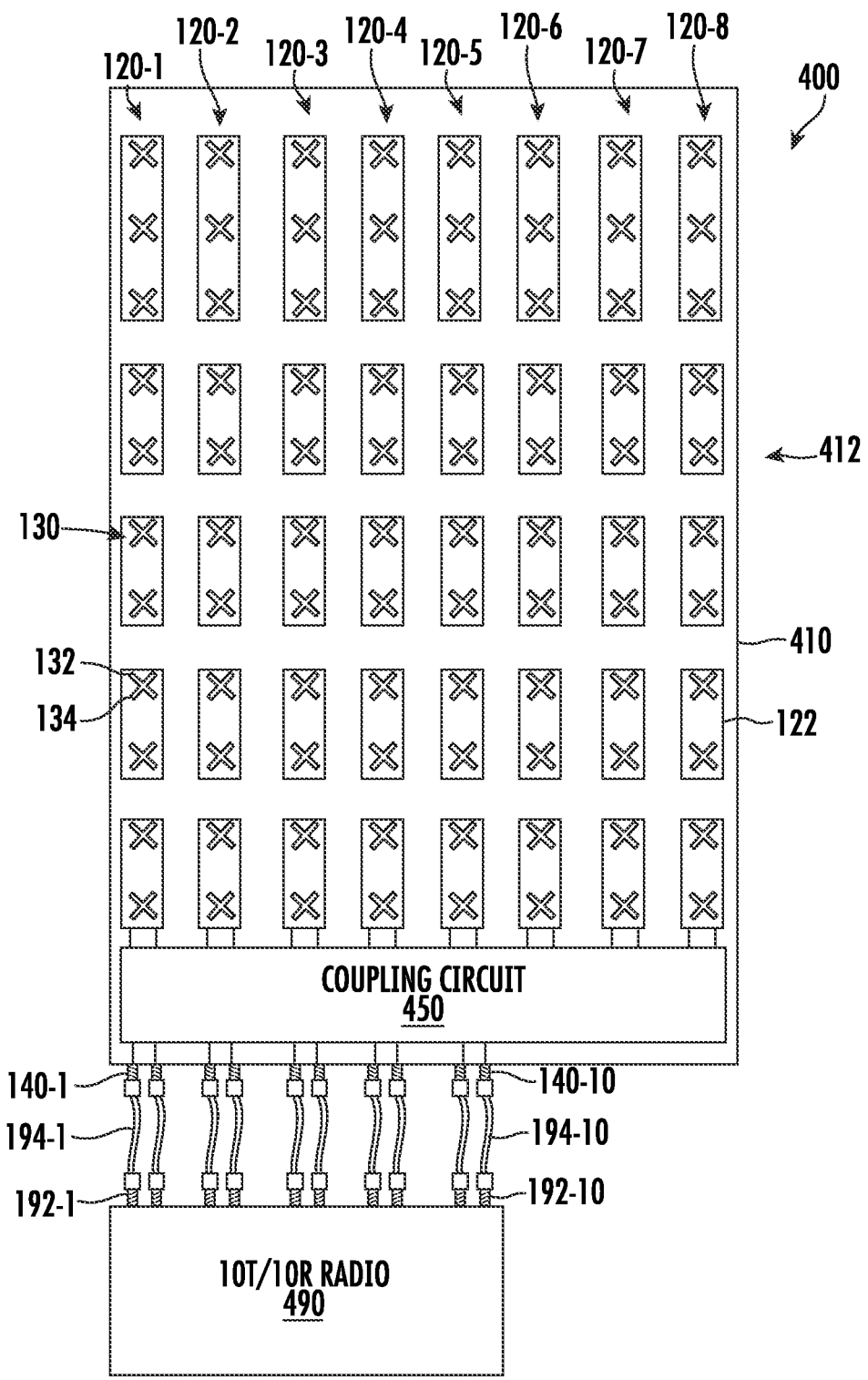
FIG. 4A is a schematic front view of an antenna system according to embodiments of the present invention that includes a 10T10R radio, a coupling circuit, and an antenna array that includes eight columns of dual-polarized radiating elements.

FIG. 4A is a schematic front view of an antenna system 400 according to further embodiments of the present invention that includes a 10T10R radio 490, a coupling circuit 450, and an antenna 410 having an antenna array 412 that includes eight columns 120 of dual-polarized radiating elements 130.

Figure 4B:
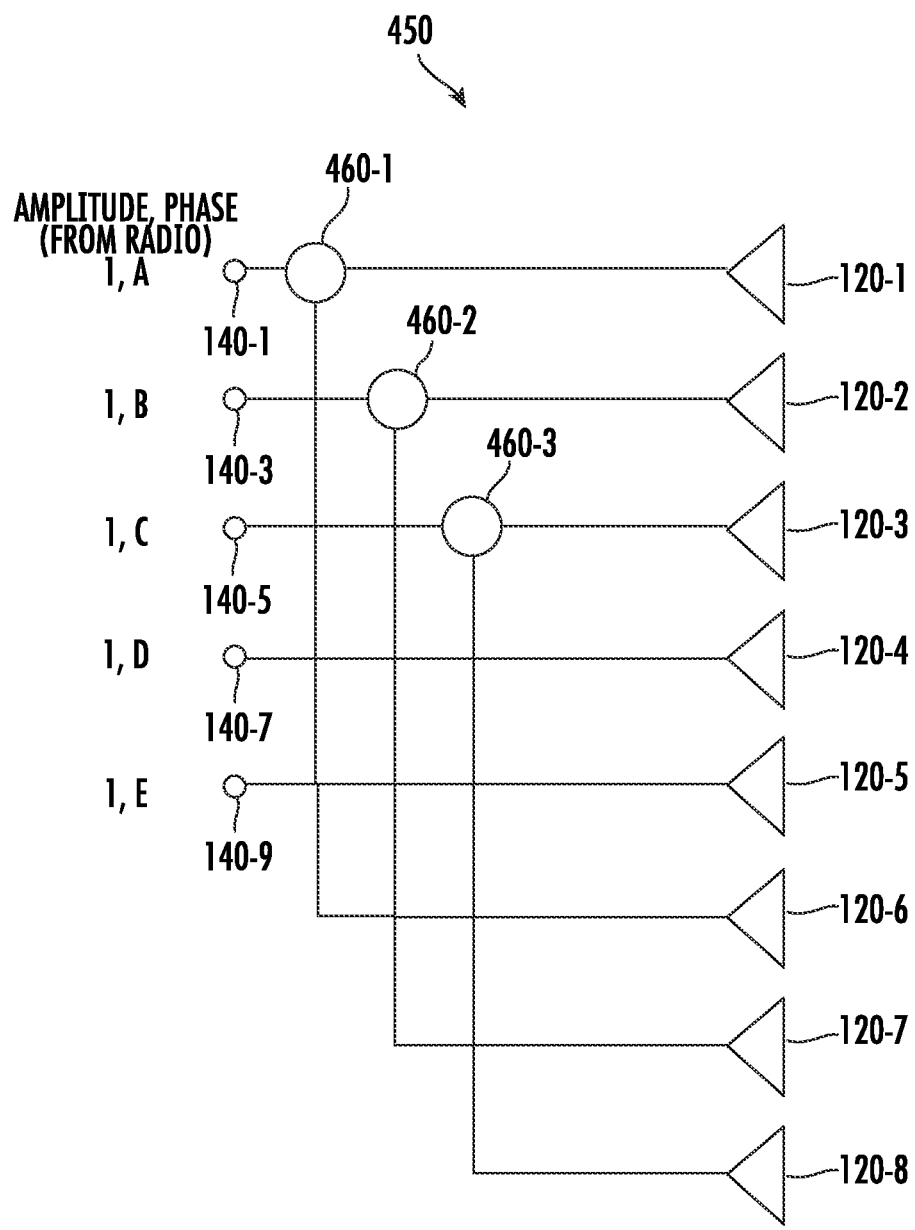
FIG. 4B is a schematic diagram illustrating a coupling circuit according to embodiments of the present invention that can be used to couple the 10T10R radio of FIG. 4A to the eight-column antenna array of FIG. 4A.

FIG. 4B is a schematic diagram illustrating an embodiment of the coupling circuit 450 that can be used to couple the 10T10R radio 490 of FIG. 4A to the eight-column antenna array of FIG. 4A. The coupling circuit 450 may include three couplers and/or splitters 460-1 through 460-3. Each of the couplers and/or splitters 460 may electrically connect a respective radio signal port 192 of the radio 490 (via a respective antenna signal port 140 of the antenna 410) to a pair of columns 120 of antenna array 412.

The first coupler and/or splitter 460-1 connects the first antenna signal port 140-1 to both the first column 120-1 and the sixth column 120-6. The second coupler and/or splitter 460-2 connects the third antenna signal port 140-3 to both the second column 120-2 and the seventh column 120-7. Likewise, the third coupler and/or splitter 460-4 connects the fifth antenna signal port 140-5 to both the third column 120-3 and the eighth column 120-8. Accordingly, each commonly-coupled pair of columns 120 may be a non-adjacent pair having four columns 120 therebetween.

Columns 120-4 and 120-5 may, in some embodiments, be individually (rather than commonly) coupled to respective antenna signal ports 140-7 and 140-9. Antenna signal ports 140-1 and 140-5, as well as antenna signal ports 140-3, 140-7, and 140-9, may be first polarization ports. For simplicity of illustration, second polarization antenna signal ports 140-2, 140-4, 140-6, 140-8, and 140-10 are omitted from view in FIG. 4B. An identical circuit including three additional couplers and/or splitters 460 may be used to couple the second polarization antenna signal ports 140-2, 140-4, 140-6, 140-8, and 140-10 to the second polarization radiators 134 of the radiating elements 130 in antenna array 412.

The coupling circuit 450 may be configured to provide a 180-degree phase offset between commonly-coupled columns 120. Moreover, the columns 120 may be spaced apart from each other by about 62 mm.

FIG. 4C is a table illustrating the relative amplitudes and phases applied to the signals fed to the eight columns of the antenna array of FIG. 4A via the coupling circuit of FIG. 4B in order generate the ten antenna beams (five at each polarization). As shown in FIG. 4C, in an example embodiment, columns 120-1 through 120-3 may be fed RF signals having the same amplitude and phase as the RF signals fed to columns 120-6 through 120-8, respectively. Columns 120-4 and 120-5, on the other hand, may be fed RF signals different amplitudes and phases.

FIG. 5A is a schematic front view of an antenna system 500 according to embodiments of the present invention that includes a 4T4R radio 590, a coupling circuit 550, and an antenna 510 having an antenna array 512 that includes four columns 120 of dual-polarized radiating elements 130.

FIG. 5B is a schematic diagram illustrating a coupling circuit 550 according to embodiments of the present invention that can be used to couple the 4T4R radio 590 of FIG. 5A to the four-column antenna array of FIG. 5A. The coupling circuit 550 may include two couplers 560-1 and 560-2. Each of the couplers and/or splitters 560 may electrically connect a respective radio signal port 192 of the radio 590 (via a respective antenna signal port 140 of the antenna 510) to a pair of columns 120.

The first coupler and/or splitter 560-1 connects the first antenna signal port 140-1 to both the first column 120-1 and the third column 120-3. Similarly, the second coupler and/or splitter 560-2 connects the third antenna signal port 140-3 both the second column 120-2 and the fourth column 120-4. Accordingly, each commonly-coupled pair of columns 120 may be a non-adjacent pair having one column 120 therebetween. The antenna signal ports 140-1 and 140-3 may be first polarization antenna signal ports. For simplicity of illustration, the second polarization antenna signal ports 140-2 and 140-4 are omitted from view in FIG. 5B. An identical circuit including two additional couplers and/or splitters 560 may be used to couple the second polarization antenna signal ports 140-2 and 140-4 to the second polarization radiators 134 of the radiating elements 130 in antenna array 512.

In some embodiments, the orientation of the hook baluns on the dipole radiators 132, 134 of the radiating elements 130 included in columns 120-1 and 120-4 may be reversed as compared to the orientation of the hook baluns on the dipole radiators 132, 134 of the radiating elements 130 included in columns 120-2 and 120-3 in order to implement the phase shifts between the signals fed to various of the columns 120. Moreover, the columns 120 may be spaced apart from each other by at least 58 mm.

FIG. 5C is a table illustrating the relative amplitudes and phases applied to the signals fed to the four columns of the antenna array of FIG. 5A via the coupling circuit that is shown in FIG. 5B in order generate four antenna beams (two at each polarization)

Figure 6B:
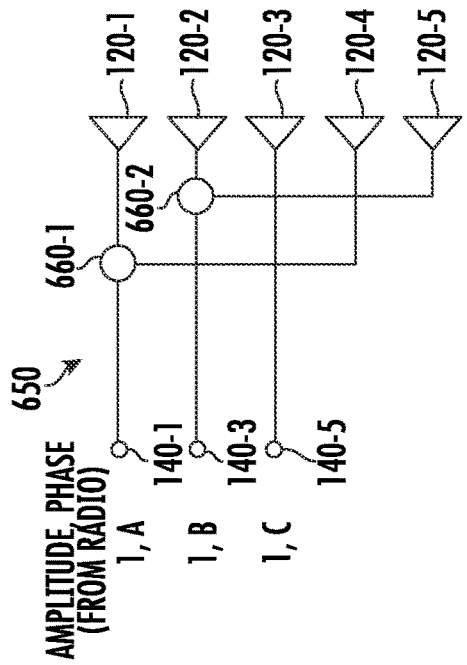
FIG. 6B is a schematic diagram illustrating a coupling circuit according to embodiments of the present invention that can be used to couple the 8T8R radio of FIG. 6A (with two ports unused) to the five-column antenna array of FIG. 6A.
Figure 6C:
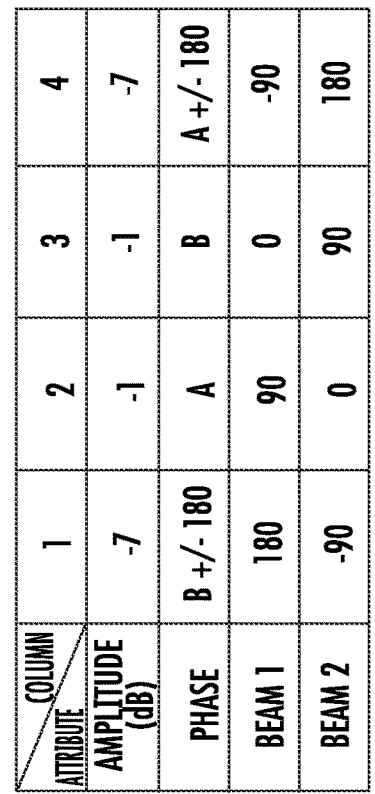
FIG. 6C is a table illustrating the relative amplitudes and phases applied to the signals fed to the five columns of the antenna array of FIG. 6A via the coupling circuit that is shown in FIG. 6B in order generate the four antenna beams (two at each polarization).
Figure 6A:
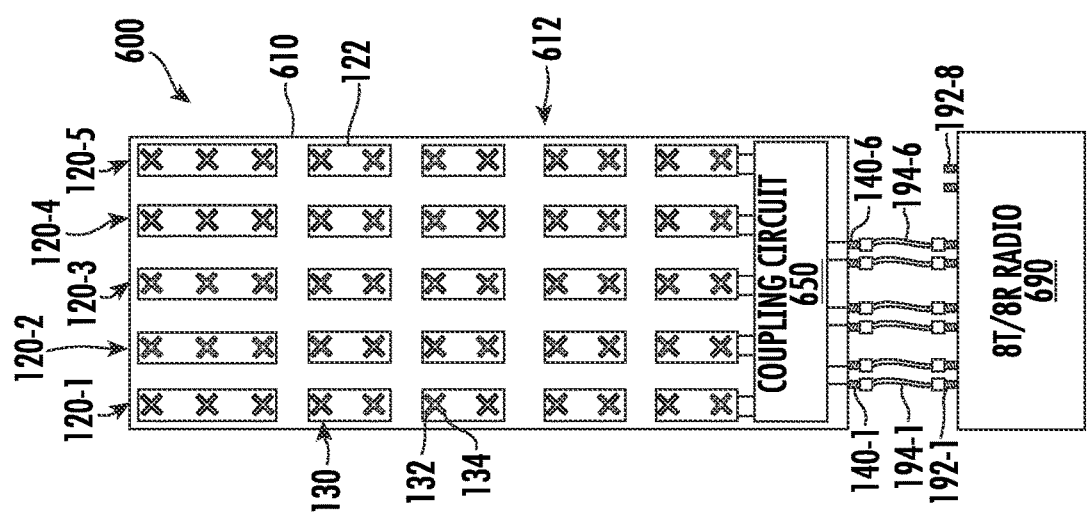
FIG. 6A is a schematic front view of an antenna system according to embodiments of the present invention that includes a 8T8R radio, a coupling circuit, and an antenna array that includes five columns of dual-polarized radiating elements.

FIG. 6A is a schematic front view of an antenna system 600 according to embodiments of the present invention that includes a 8T8R radio 690, a coupling circuit 650, and an antenna 610 having an antenna array 612 that includes five columns 120 of dual-polarized radiating elements 130.

FIG. 6B is a schematic diagram illustrating a coupling circuit 650 according to embodiments of the present invention that can be used to couple the 8T8R radio 690 of FIG. 6A (with two radio signal ports 192 unused) to the five-column antenna array of FIG. 6A. The coupling circuit 650 may include two couplers and/or splitters 660-1 and 660-2. Each of the couplers and/or splitters 660 may electrically connect a respective radio signal port 192 (via a respective antenna signal port 140 of the antenna 610) to a pair of columns 120.

The first coupler and/or splitter 660-1 connects the first antenna signal port 140-1 to both the first column 120-1 and the fourth column 120-4. Similarly, the second coupler and/or splitter 660-2 connects the third antenna signal port 140-3 to both the second column 120-2 and the fifth column 120-5. Accordingly, each commonly-coupled pair of columns 120 may be a non-adjacent pair having two columns 120 therebetween.

Column 120-3 may, in some embodiments, be the only column 120 that is coupled to the fifth antenna signal port 140-5. Antenna signal ports 140-1, 140-3, and 140-5, may be first polarization antenna signal ports. For simplicity of illustration, second polarization antenna signal ports 140-2, 140-4, and 140-6 are omitted from view in FIG. 6B. An identical circuit including two additional couplers and/or splitters 660 may be used to couple the second polarization antenna signal ports 140-2, 140-4 and 140-6 to the second polarization radiators 134 of the radiating elements 130 in antenna array 612. As shown in FIG. 6A, the beamforming radio 690 includes seventh and eighth radio signal ports 192-7 and 192-8 that are not coupled to the antenna 610 and instead are unused.

FIG. 6C is a table illustrating the relative amplitudes and phases applied to the signals fed to the five columns of the antenna array of FIG. 6A via the coupling circuit that is shown in FIG. 6B in order generate the four antenna beams (two at each polarization).

Figure 7A:
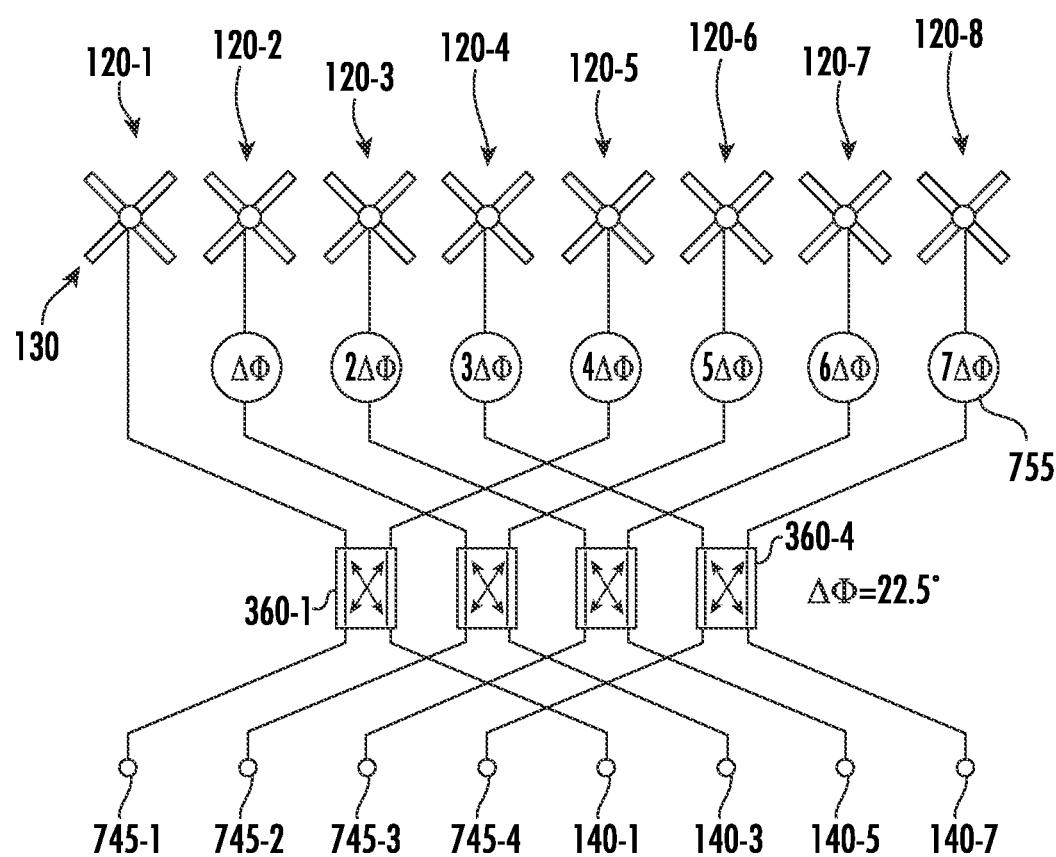
FIG. 7A is a schematic block diagram of an example implementation of the antenna array and coupling circuit of the antenna system of FIGS. 3A-3B (illustrating one polarization only).

FIG. 7A is a schematic block diagram of an example implementation of the antenna array 312 and coupling circuit 350 of the antenna system 300 of FIGS. 3A and 3B (illustrating one polarization only). In particular, FIG. 7A shows that each coupler and/or splitter 360 of the coupling circuit 350 may be a four-port hybrid coupler having (i) an RF input port that is coupled to a respective antenna signal port 140 (FIG. 3A) and thus to a respective radio signal port 192 (FIG. 3A), (ii) a first RF output port that is coupled to one of the columns 120, (iii) a second RF output port that is coupled to another of the columns 120, and (iv) an isolation port that is coupled to a resistive termination 745 (e.g., a 50-Ohm resistor). For simplicity of illustration, only one radiating element 130 is shown per column 120.

In some embodiments, analog RF circuitry may provide a phase adjustment to a signal that is output from a coupler and/or splitter 360 before it reaches a column 120. For example, respective phase-adjustment components 755 may be coupled to the columns 120. As an example, the phase-adjustment components 755 may be delay lines or other phase shifting elements.

Figure 7B:
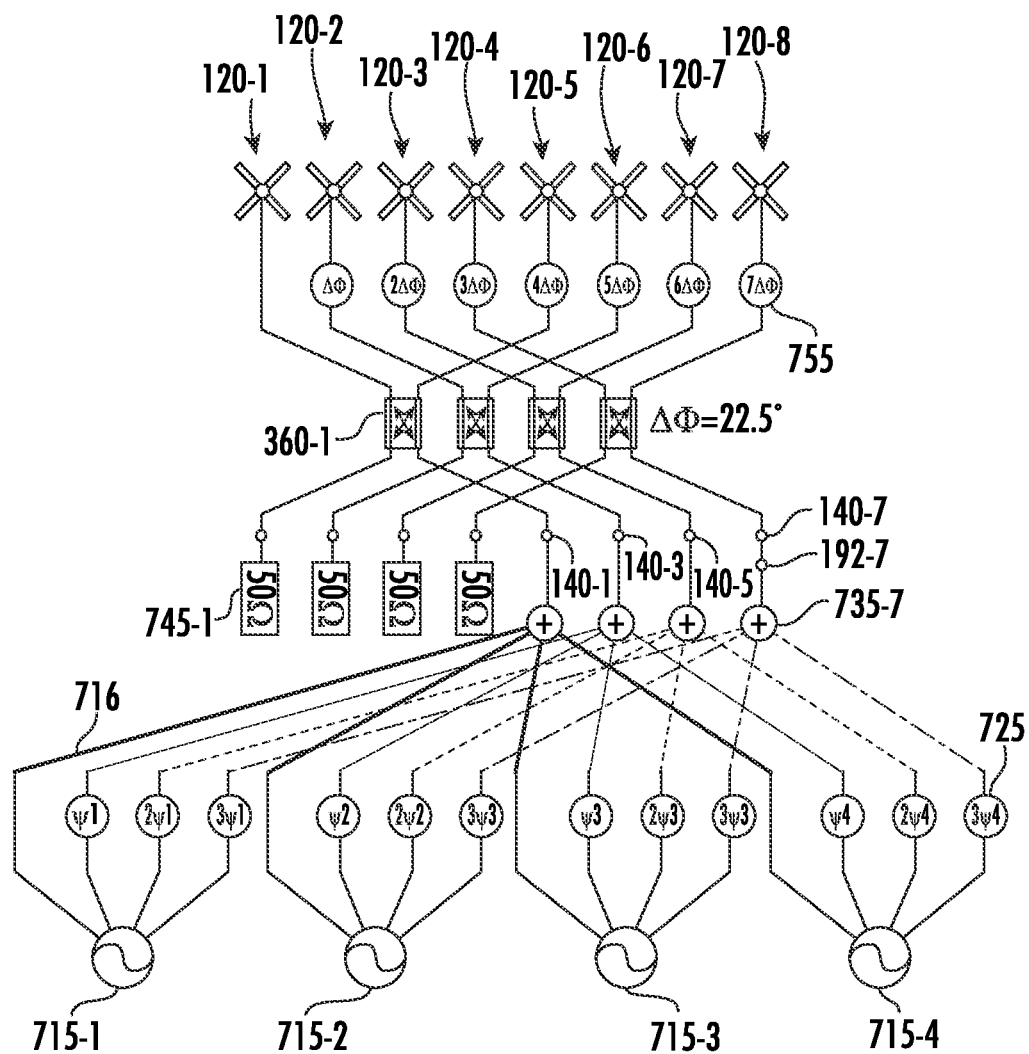
FIG. 7B is a schematic block diagram illustrating how the first polarization signal sources of an 8T8R radio may be coupled to the antenna array and coupling circuit of FIG. 7A.

FIG. 7B is a schematic block diagram illustrating how the signal sources of an 8T8R radio may be coupled to the antenna array and coupling circuit of FIG. 7A. For simplicity of illustration, the interface between the radio 290 and the antenna 310 (FIG. 3A) is represented in FIG. 7B by only the four first polarization antenna signal ports 140-1, 140-3, 140-5, and 140-7. As shown in more detail in FIG. 3A, the first polarization antenna signal ports 140-1, 140-3, 140-5, and 140-7 are coupled to respective first polarization radio signal ports 192-1, 192-3, 192-5, and 192-7 of the radio 290. Each radio signal port 192 may be coupled between a respective combiner 735 and a respective antenna signal port 140. For simplicity of illustration, however, only radio signal port 192-7 is shown in FIG. 7B. A circuit identical to the circuit shown in FIG. 7B also exists for the second polarization.

The radio 290 includes four first polarization RF signal sources 715. Each signal source 715 is configured to generate four different RF signal components 716 that the radio 290 provides to different respective ports 192. For example, the radio 290 may include RF combiners 735 that each combine four signal components 716 from respective signal sources 715 and output the resulting combined signal to a radio signal port 192. Accordingly, each first polarization signal source 715 may be coupled to all of the first polarization radio signal ports 192, and may simultaneously generate signal components 716 for four antenna beams. Moreover, the radio 290 may be configured to individually adjust each signal component 716. As an example, the radio 290 may include phase-adjustment components 725 that are between the signal sources 715 and the combiners 735, or may otherwise generate RF components having different phases, as shown in FIG. 7B.

In some embodiments, functionality of the phase-adjustment components 725 and/or the combiners 735 may be provided by the radio 290 in the digital domain rather than using analog RF components. Moreover, the radio 290 can control each of the signal sources 715 to individually turn on or off an antenna beam. For example, the radio 290 can do so by controlling the signal sources 715 to individually turn on or off any of the signal components 716.

Figure 8:
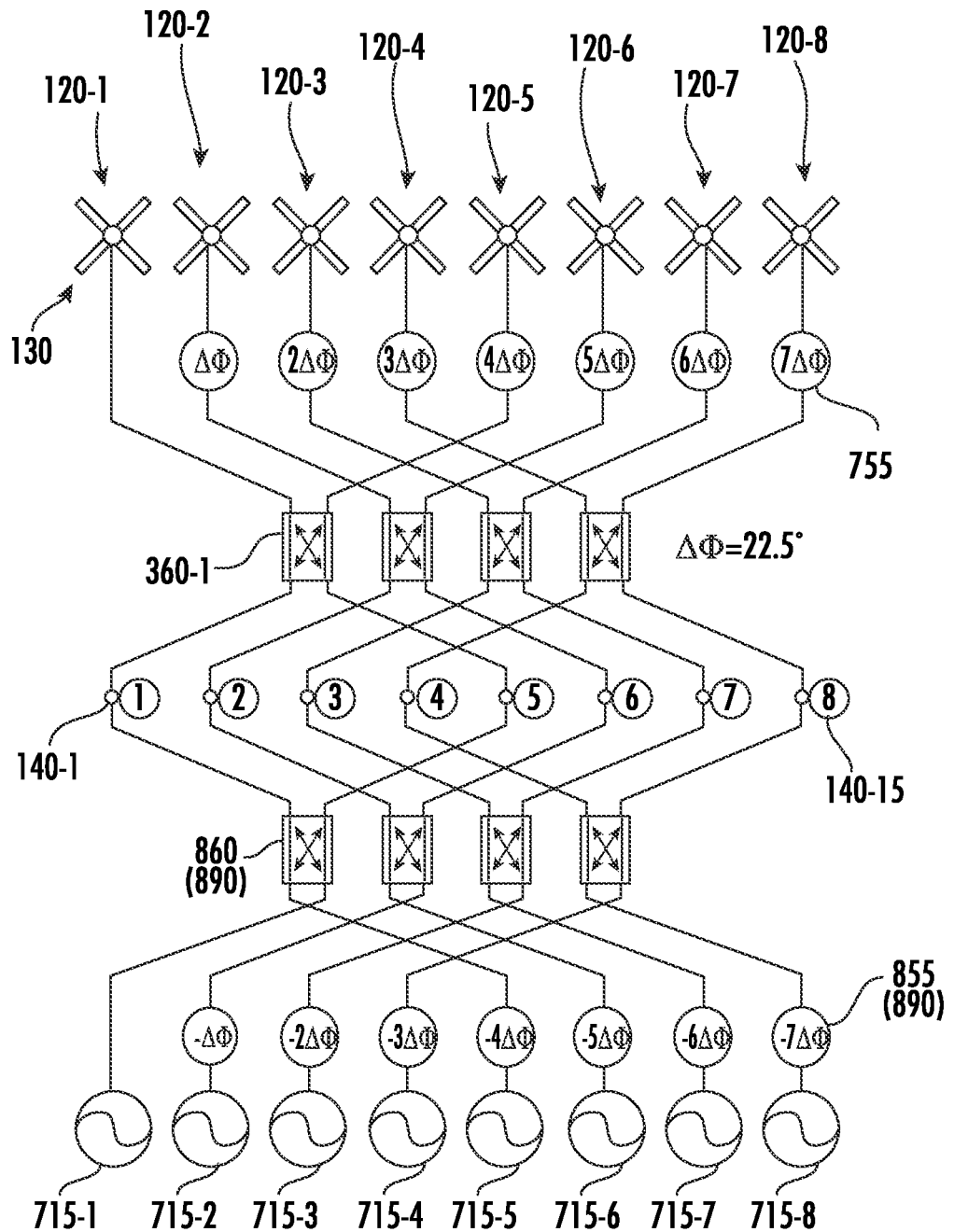
FIG. 8 is a schematic diagram of an antenna system according to embodiments of the present invention.

FIG. 8 is a schematic diagram of an antenna system according to embodiments of the present invention. The system may include a 16T16R radio 890. The radio 890 may include eight RF signal sources 715 per polarization. Moreover, the radio 890 may include phase-adjustment components 855 that mirror analog phase-adjustment components 755 that are between the columns 120 and the couplers and/or splitters 360. The radio 890 may also include couplers and/or splitters 860 that mirror the couplers and/or splitters 360. In some embodiments, the radio 890 may provide functionality of the couplers and/or splitters 860 and the phase-adjustment components 855 in the digital domain rather than using analog RF components. Accordingly, the radio 890 may compensate for analog RF circuitry, such as the couplers and/or splitters 360 and the phase-adjustment components 755, that feeds the columns 120 by digitally mirroring the analog RF circuitry. Such digital mirroring may be less expensive than analog mirroring (i.e., additional hardware) inside the radio 890.

Figure 9:
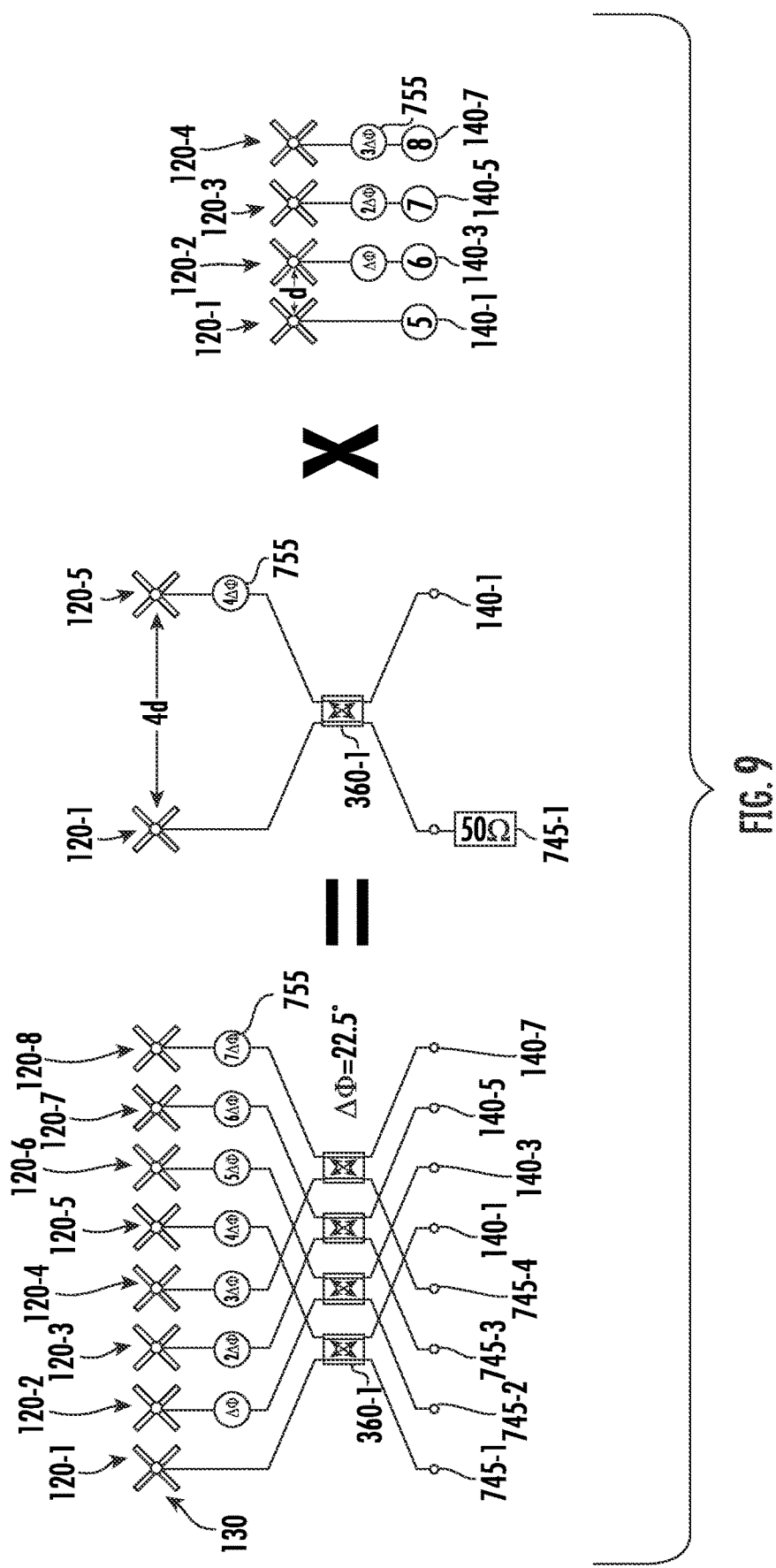
FIG. 9 is a schematic diagram illustrating how the antenna systems according to embodiments of the present invention may be viewed as including a plurality of multi-column sub-arrays.

FIG. 9 is a schematic diagram illustrating how the antenna systems according to embodiments of the present invention may be viewed as including a plurality of multi-column sub-arrays. As shown in FIG. 9, adjacent columns 120 may be spaced apart from each other (center-to-center) by a distance d. Accordingly, a pair of columns 120-1 and 120-5 that are commonly-fed by a coupler and/or splitter 360-1 and have three columns 120 therebetween may be spaced apart by a distance 4d. This commonly-fed pair may be considered a two-column 120 sub-array. In aggregate, the antenna system may thus have four two-column 120 sub-arrays.

Antenna systems according to embodiments of the present invention can generate any multiple antenna beams, which may be defined by the distance 4d. This example is 4 times a half wavelength, so it is for four antenna beams.

Figure 10:
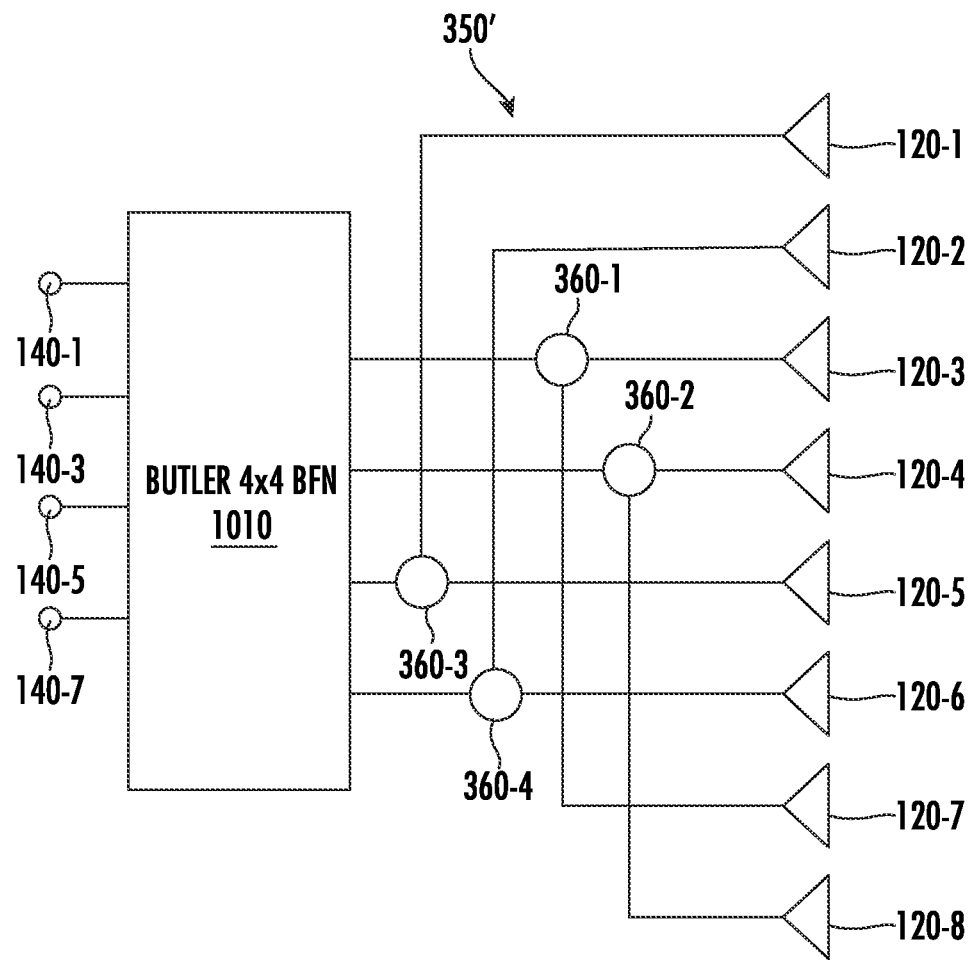
FIG. 10 is a schematic diagram illustrating a Butler Matrix beamforming network that is connected to the coupling circuit of FIG. 3D.

FIG. 10 is a schematic diagram illustrating a Butler Matrix beamforming network ("BFN") 1010 that is connected to the coupling circuit 350' of FIG. 3D. The BFN 1010 is configured to generate progressive phase (e.g., −157.5, +67.5, −67.5, and +157.5, for different columns 120) that creates antenna beams. Moreover, the coupling circuit 350' is provided merely as an example, and any coupling circuit herein may be connected to a Butler Matrix BFN. As shown in FIG. 10, the BFN 1010 is a 4×4 (four ports connected to four radios) BFN that is connected between the coupling circuit 350' and ports 140-1, 140-3, 140-5, and 140-7 of antenna 310 (FIG. 3A). Accordingly, the BFN 1010 may, in some embodiments, be an analog circuit that is inside the antenna 310. In other embodiments, matrix manipulation that the BFN 1010 is configured to perform may instead be performed digitally by the radio 290 (FIG. 3A).

As a result of using the BFN 1010 for beamforming, each of the 4 ports 140 of a given polarization may be connected to all (e.g., all 8) columns 120. For simplicity of illustration, only one polarization is shown in FIG. 10. The same BFN 1010, however, may be connected to couplers and/or splitters 360 of both polarizations.

Figure 11A:
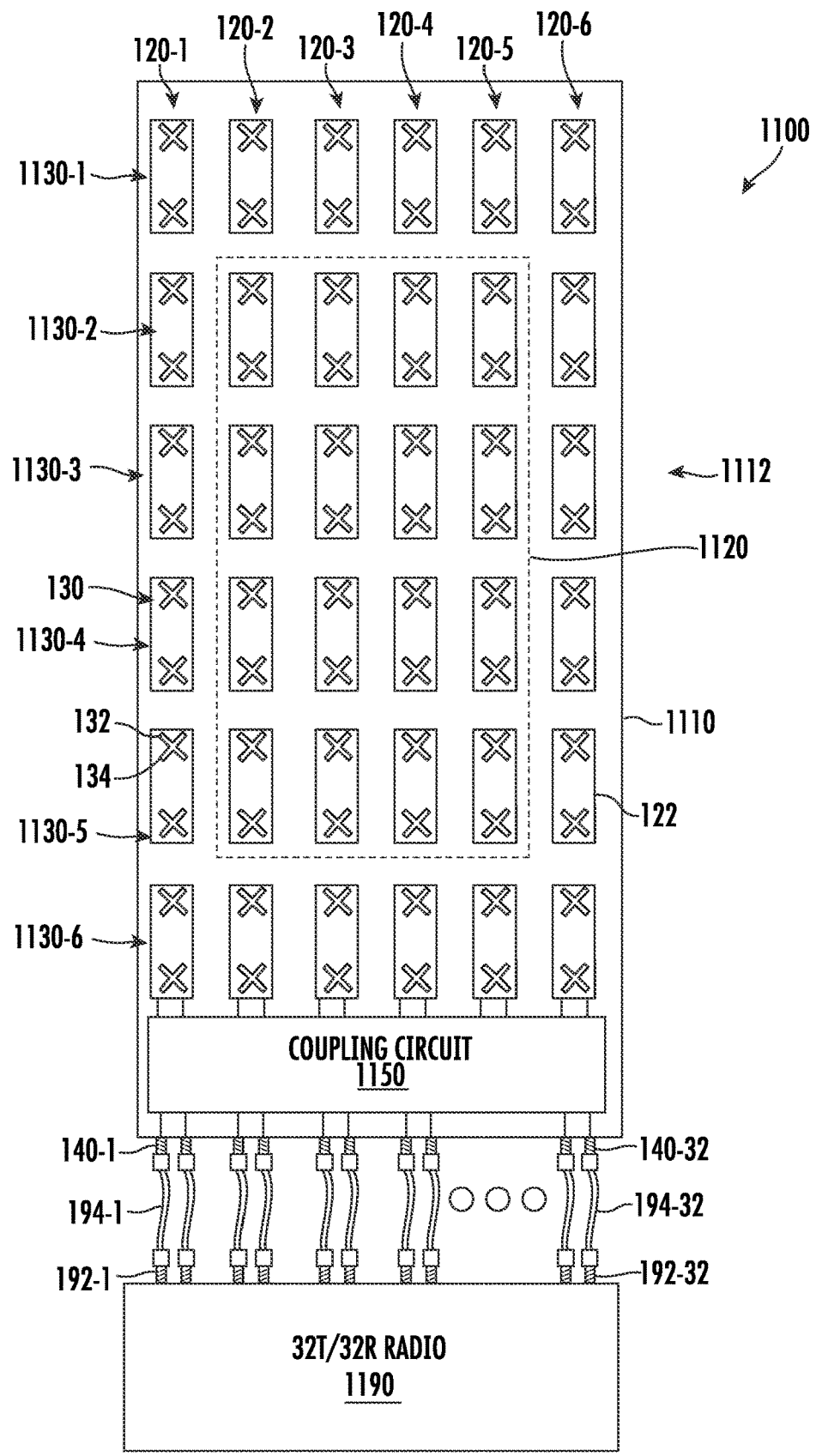
FIGS. 11A and 11B are schematic front views of massive MIMO antenna systems according to embodiments of the present invention.
Figure 11B:
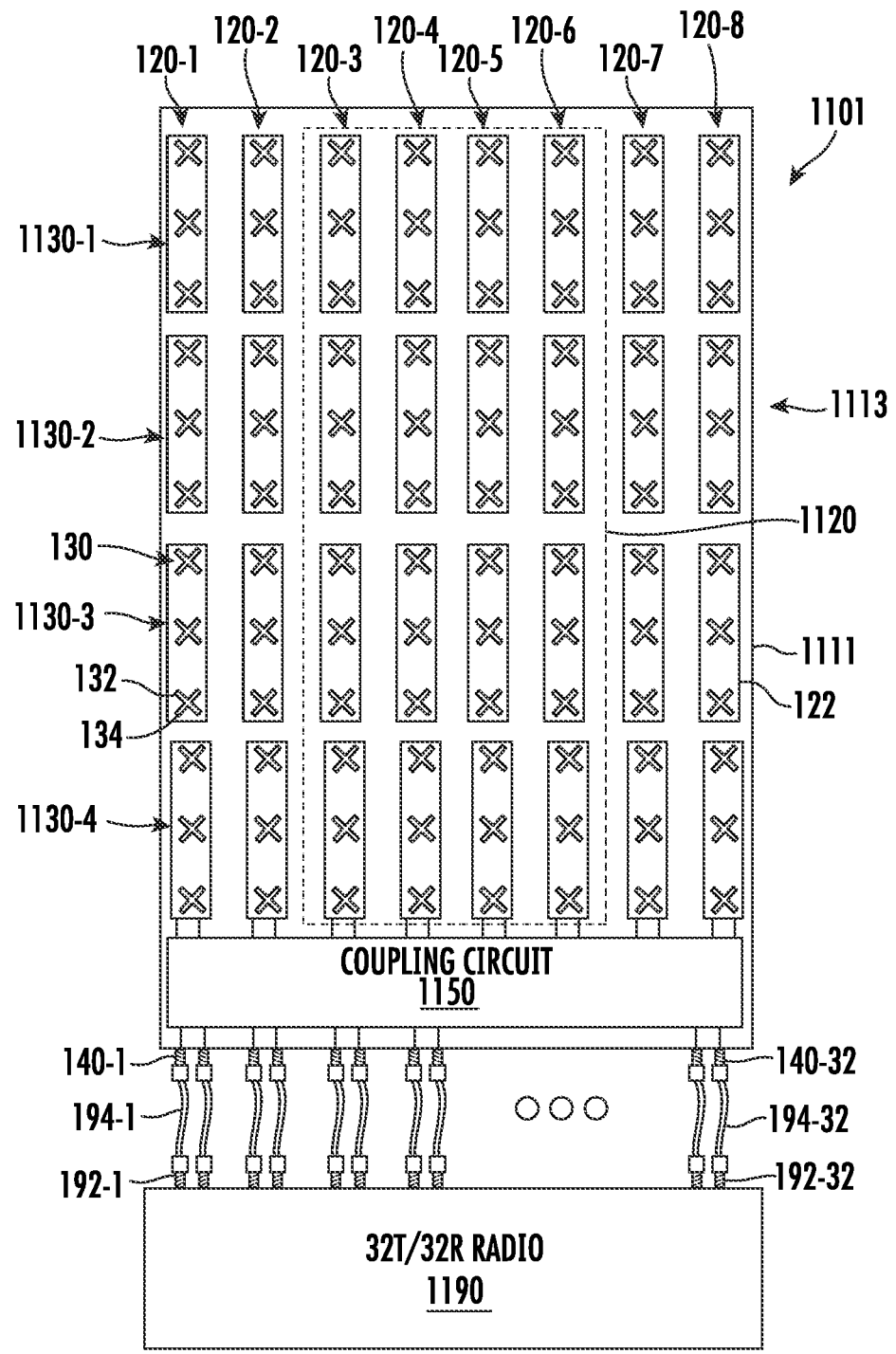

FIGS. 11A and 11B are schematic front views of massive MIMO antenna systems according to embodiments of the present invention. As shown in FIG. 11A, antenna system 1100 according to embodiments of the present invention includes a 32T32R beamforming radio 1190, a coupling circuit 1150, and an antenna 1110 having an antenna array 1112 that includes six columns 120-1 through 120-6 and six rows 1130-1 through 1130-6 of dual-polarized radiating elements 130. The radio 1190 includes thirty-two radio signal ports 192-1 through 192-32. In some embodiments, all thirty-two ports 192 (i.e., sixteen ports 192 per polarization) are coupled to the antenna array 1112 through the coupling circuit 1150.

As schematically illustrated in FIG. 11A, the coupling circuit 1150 may include a plurality of couplers and/or splitters (e.g., power dividers) 1160 (FIG. 12A) that are coupled to multiple rows 1130, thereby providing a significant cost saving by facilitating the use of the radio 1190 rather than a 64T64R radio, which would have sixty-four radio signal ports. Each radio signal port 192 of the radio 1190 may thus be shared by multiple rows 1130 instead of (or in addition to) being shared by multiple columns 120. Accordingly, while other examples herein discuss columns 120 that share an RF signal that is output by a single port 192, each port 192 in those examples that outputs an RF signal may additionally or alternatively be coupled to multiple rows 1130. To reduce the complexity of the feeding network (e.g., the coupling circuit 1150) for the antenna array 1112, only multiple rows 1130 or only multiple columns 120 (rather than both) may, in some embodiments, be coupled to each port 192.

As used herein, the term "row" refers to a row of groups 122 of radiating elements 130, where each group 122 may include at least two radiating elements 130. Each group 122 is part of a column 120, and thus may be referred to herein as a "sub-column." Moreover, some groups 122 may, in some embodiments, be in a sub-array 1120 of (e.g., a set of sixteen) groups 122 that share ports 192 of the radio 1190 with other groups 122 that are outside of the sub-array 1120. For example, (i) a group 122 that is outside of the sub-array 1120 in row 1130-1 and (ii) another group 122 that is inside the sub-array 1120 in row 1130-5 (and in, e.g., column 120-5) may be coupled to the radio 1190 by the same coupler and/or splitter 1160 of the coupling circuit 1150. Additional couplers and/or splitters 1160 of the coupling circuit 1150 may couple additional pairs of the groups 122 to the radio 1190.

In some embodiments, the antenna array 1112 may be expanded to include more rows 1130 and/or more columns 120 while still using the radio 1190. For example, adding two rows 1130 (for a total of eight) may increase the vertical gain of the antenna array 1112. As another example, adding two columns 120 (for a total of eight) may increase the azimuth gain of the antenna array 1112. On the other hand, using a total of six rows 1130 and six columns 120 can maintain a small size and low cost of the antenna array 1112 relative to expanded variants thereof. Accordingly, the antenna array 1112 may have at least six rows 1130 and at least six columns 120, with performance, size, and cost tradeoffs based on whether the number is six, seven, or eight.

Though the antenna array 1112 is shown as having seventy-two radiating elements 130, adding rows 1130 and/or columns 120 to the antenna array 1112 may increase the number of radiating elements 130 to, for example, ninety-six or one hundred twenty-eight. The antenna array 1112 may thus have at least seventy-two radiating elements 130 that are fed by ports 192 of the radio 1190.

Referring to FIG. 11B, antenna system 1101 according to embodiments of the present invention includes a 32T32R radio 1190, a coupling circuit 1150, and an antenna 1111 having an antenna array 1113 that includes eight columns 120-1 through 120-8 and four rows 1130-1 through 1130-4 of dual-polarized radiating elements 130. In particular, each group 122 in FIG. 11B includes exactly three radiating elements 130, whereas each group 122 in FIG. 11A includes exactly two radiating elements 130. Though the arrays 1112 (FIG. 11A) and 1113 may each have the same total number of radiating elements 130, the array 1112 may provide a better radiation pattern, due to its additional rows 1130.

Figure 12A:
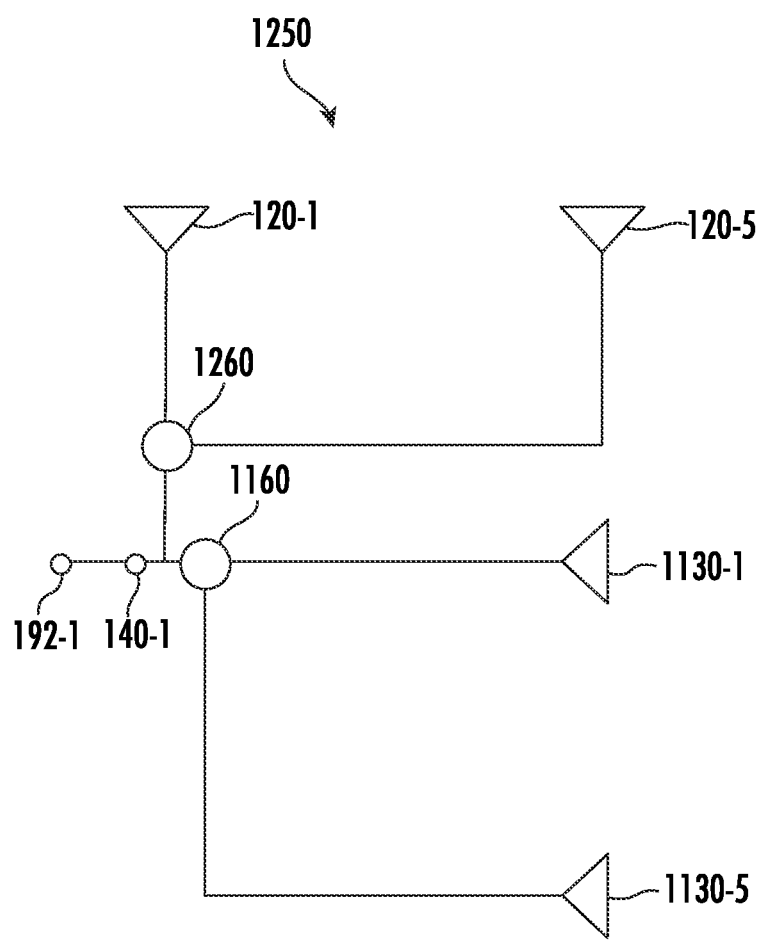
FIG. 12A is a schematic diagram illustrating a coupling circuit according to embodiments of the present invention that can be used to couple a port of the 32T32R radio of FIG. 11A to multiple rows and multiple columns of the antenna array of FIG. 11A.

FIG. 12A is a schematic diagram illustrating a coupling circuit 1250 according to embodiments of the present invention that can be used to couple a first polarization radio signal port 192-1 of the 32T32R radio 1190 of FIG. 11A to multiple rows 1130 and multiple columns 120 of the antenna array 1112 of FIG. 11A. In particular, FIG. 12A illustrates an example in which the port 192-1 is coupled to rows 1130-1 and 1130-5 by a coupler and/or splitter 1160, and is coupled to columns 120-1 and 120-5 by another coupler and/or splitter 1260. For simplicity of illustration, only one port 192-1 of one polarization of the 32T32R radio 1190 is shown in FIG. 12A. The coupling circuit 1250, however, may include additional couplers and/or splitters 1160 and 1260 that couple other first polarization radio signal ports 192 (e.g., ports 192-3, 192-5, etc.) to the array 1112. An identical coupling circuit 1250 may be used to couple the second polarization radio signal ports 192-2, 192-4, etc. to the columns 120 and rows 1130 of antenna array 1112. The coupling circuit 1250 may thus replace, or be a part of, another coupling circuit described herein, such as the coupling circuit 1150 of FIG. 11A.

Figure 12B:
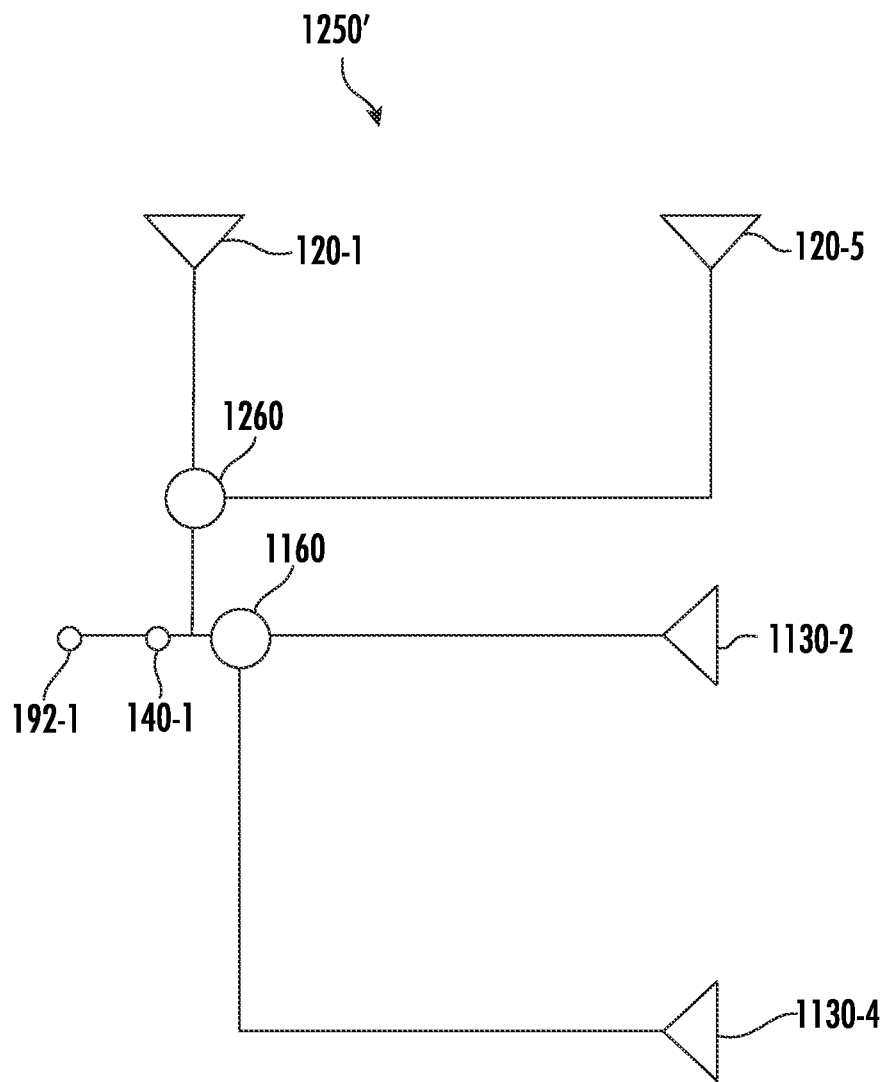
FIG. 12B is a schematic diagram illustrating a coupling circuit according to embodiments of the present invention that can be used to couple a port of the 32T32R radio of FIG. 11B to multiple rows and multiple columns of the antenna array of FIG. 11B.

FIG. 12B is a schematic diagram illustrating a coupling circuit 1250' according to embodiments of the present invention that can be used to couple a first polarization radio signal port 192-1 of the 32T32R 1190 radio of FIG. 11B to multiple rows 1130 and multiple columns 120 of the antenna array 1113 of FIG. 11B. In particular, FIG. 12B illustrates an example in which the port 192-1 is coupled to rows 1130-2 and 1130-4 by a coupler and/or splitter 1160, and is coupled to columns 120-1 and 120-5 by another coupler and/or splitter 1260. For simplicity of illustration, only one port 192-1 of one polarization of the 32T32R radio 1190 is shown in FIG. 12A. The coupling circuit 1250', however, may include additional couplers and/or splitters 1160 and 1260 that couple other first polarization radio signal ports 192 (e.g., ports 192-3, 192-5, etc.) to the array 1113. An identical coupling circuit 1250' may be used to couple the second polarization radio signal ports 192-2, 192-4, etc. to the columns 120 and rows 1130 of antenna array 1113. The coupling circuit 1250' may thus replace, or be a part of, another coupling circuit described herein, such as the coupling circuit 1150 of FIG. 11B.

The coupling circuits 1250, 1250' allow application of a flexible beam in both horizontal and vertical planes. Accordingly, performance of an antenna array that is coupled to a 32T32R radio (e.g., the radio 1190) by the coupling circuit 1250 (or the coupling circuit 1250') may be comparable to performance provided by an antenna array that is coupled to a 64T64R radio without the coupling circuit 1250 (or the coupling circuit 1250') therebetween.

Figure 13A:
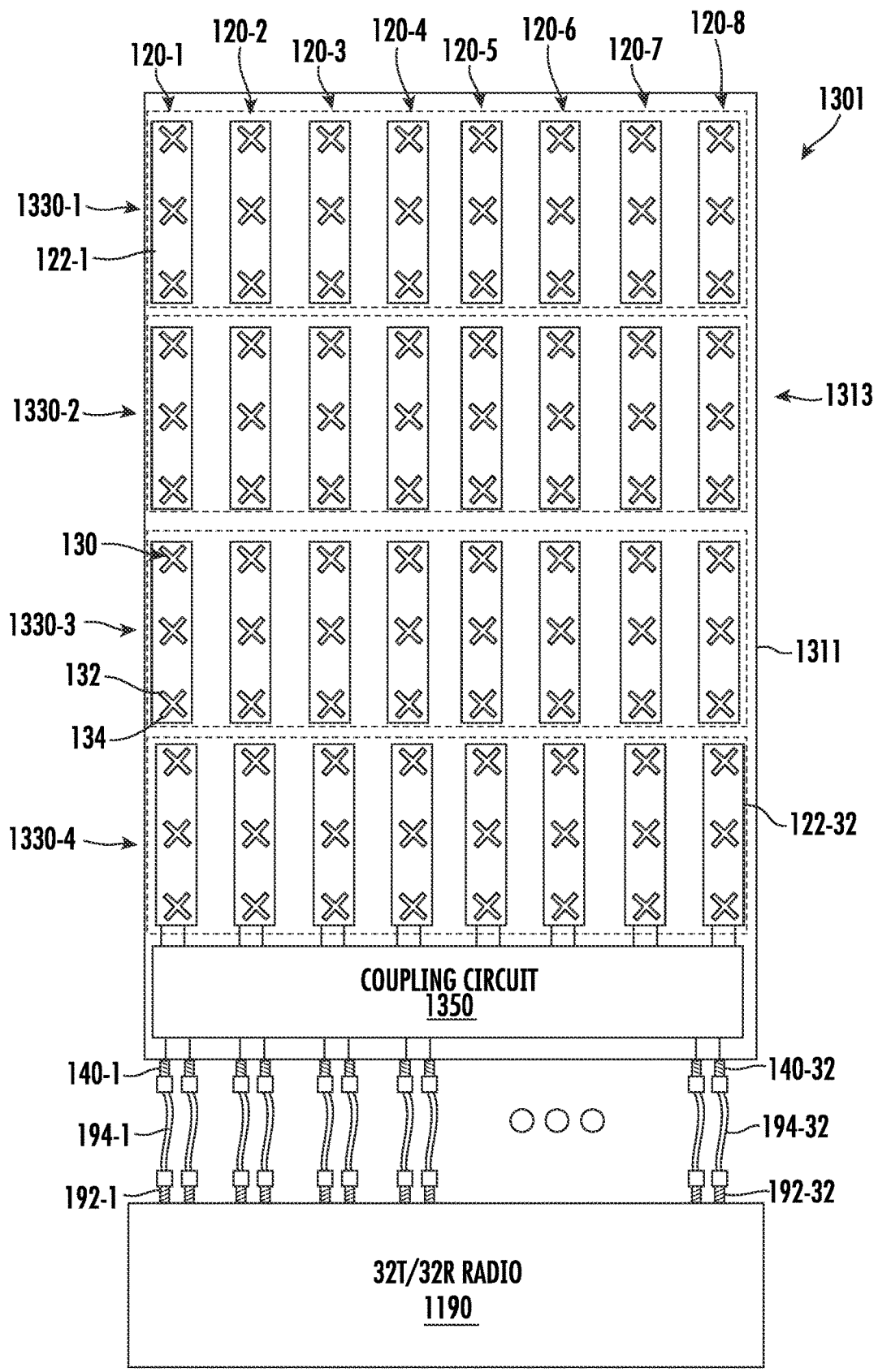
FIG. 13A is a schematic front view of a massive MIMO antenna system having four rows according to embodiments of the present invention.

FIG. 13A is a schematic front view of a massive MIMO antenna system 1301 having four rows 1330-1 through 1330-4 according to embodiments of the present invention. The system 1301 includes a 32T32R radio 1190, a coupling circuit 1350, and an antenna 1311 having an antenna array 1313 that includes eight columns 120-1 through 120-8 and the four rows 1330-1 through 1330-4 of dual-polarized radiating elements 130. In particular, each row 1330 in FIG. 13A includes eight sub-columns 122 of exactly three radiating elements 130 each. Each row 1330 is thus a sub-array comprising twenty-four radiating elements 130. The four sub-arrays (i.e., the four rows 1330-1 through 1330-4) are in a vertical stack such that they do not overlap each other in a horizontal direction. Moreover, each column 120 includes four sub-columns 122 that may not be coupled to each other by the coupling circuit 1350. Rather, the coupling circuit 1350 may couple together only sub-columns 122 that are in the same row 1330.

The 32T32R radio 1190 has thirty-two radio signal ports 192-1 through 192-32 that are coupled to thirty-two antenna signal ports 140-1 through 140-32, respectively, of the antenna 1301 through thirty-two RF transmission lines 194-1 through 194-32, respectively. Moreover, each sub-column 122 of radiating elements 130 in a row 1330 is coupled to another sub-column 122 in the row 1330. Specifically, each radio signal port 192 is coupled to a pair of the sub-columns 122 through the coupling circuit 1350. Each radio signal port 192 may thus be coupled to exactly six of the radiating elements 130.

As shown in FIG. 13A, each row 1330 may, in some embodiments, have the same number of radiating elements 130. In other embodiments, different rows 1330 may have different numbers of radiating elements 130. For example, some rows 1330 may have exactly one or exactly two radiating elements 130 in each sub-column 122 and other rows 1330 may have exactly three radiating elements 130 in each sub-column 122. Moreover, the columns 120 may, in some embodiments, be vertically staggered relative to each other.

Figure 13B:
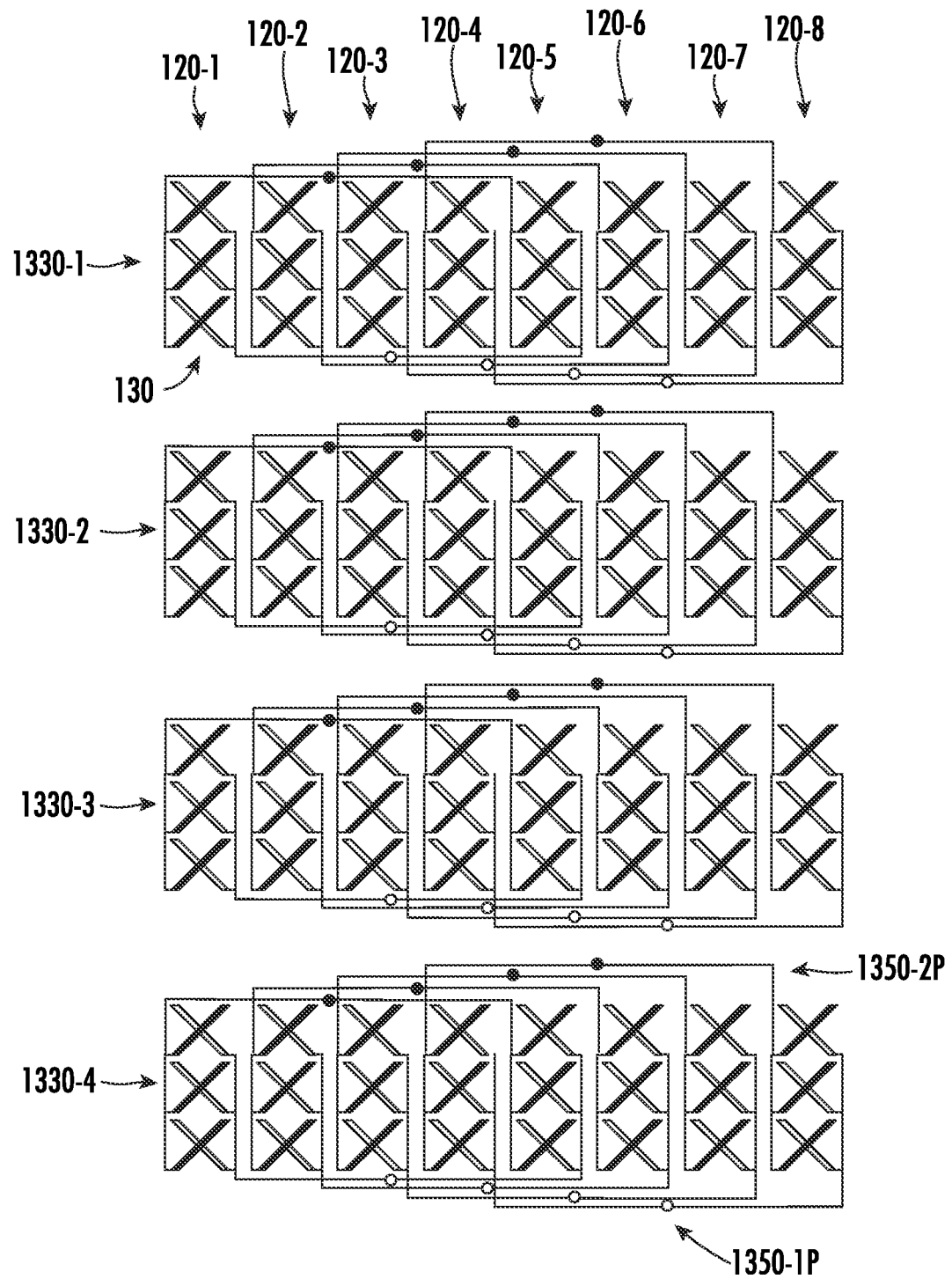
FIG. 13B is a schematic diagram illustrating a first-polarization portion and a second-polarization portion of the coupling circuit of FIG. 13A coupled to the rows of FIG. 13A.

FIG. 13B is a schematic diagram illustrating a first-polarization portion 1350-1P and a second-polarization portion 1350-2P of the coupling circuit 1350 of FIG. 13A coupled to the rows 1330. The first-polarization portion 1350-1P and the second-polarization portion 1350-2P couple each sub-column 122 (FIG. 13A) of three radiating elements 130 in a row 1330 to another sub-column 122 of three radiating elements 130 in that row 1330. The first-polarization portion 1350-1P and the second-polarization portion 1350-2P are thus each coupled to four pairs of the sub-columns 122. Moreover, as each of the four rows 1330-1 through 1330-4 is coupled to a respective first-polarization portion 1350-1P and a respective second-polarization portion 1350-2P, a total of sixteen pairs of the sub-columns 122 are coupled together by the coupling circuit 1350. Accordingly, the coupling circuit 1350 may be coupled to thirty-two sub-columns 122-1 through 122-32.

Because different rows 1330 can have different amplitudes/phases in relation to each other for beam-shaping purposes (e.g., digital beamforming), each row 1330 may be referred to herein as a "phase-adjustable row." The phase-adjustable rows enable beam steering in the elevation plane.

Moreover, radiation patterns of the phase-adjustable rows can be digitally combined with baseband. For example, each phase-adjustable row may have a certain radiation pattern in the far-field. As an example, the radiation patterns of the four (per polarization) radio signal ports 192 coupled to the row 1330-1 can be combined digitally, thereby "constructing" the phase-adjustable row radiation pattern of the row 1330-1. Multiple (i.e., at least two) phase-adjustable row patterns of different rows 1330 can be further combined, thereby constructing a whole-array (e.g., for an 8×12 array) radiation pattern.

Figure 13C:
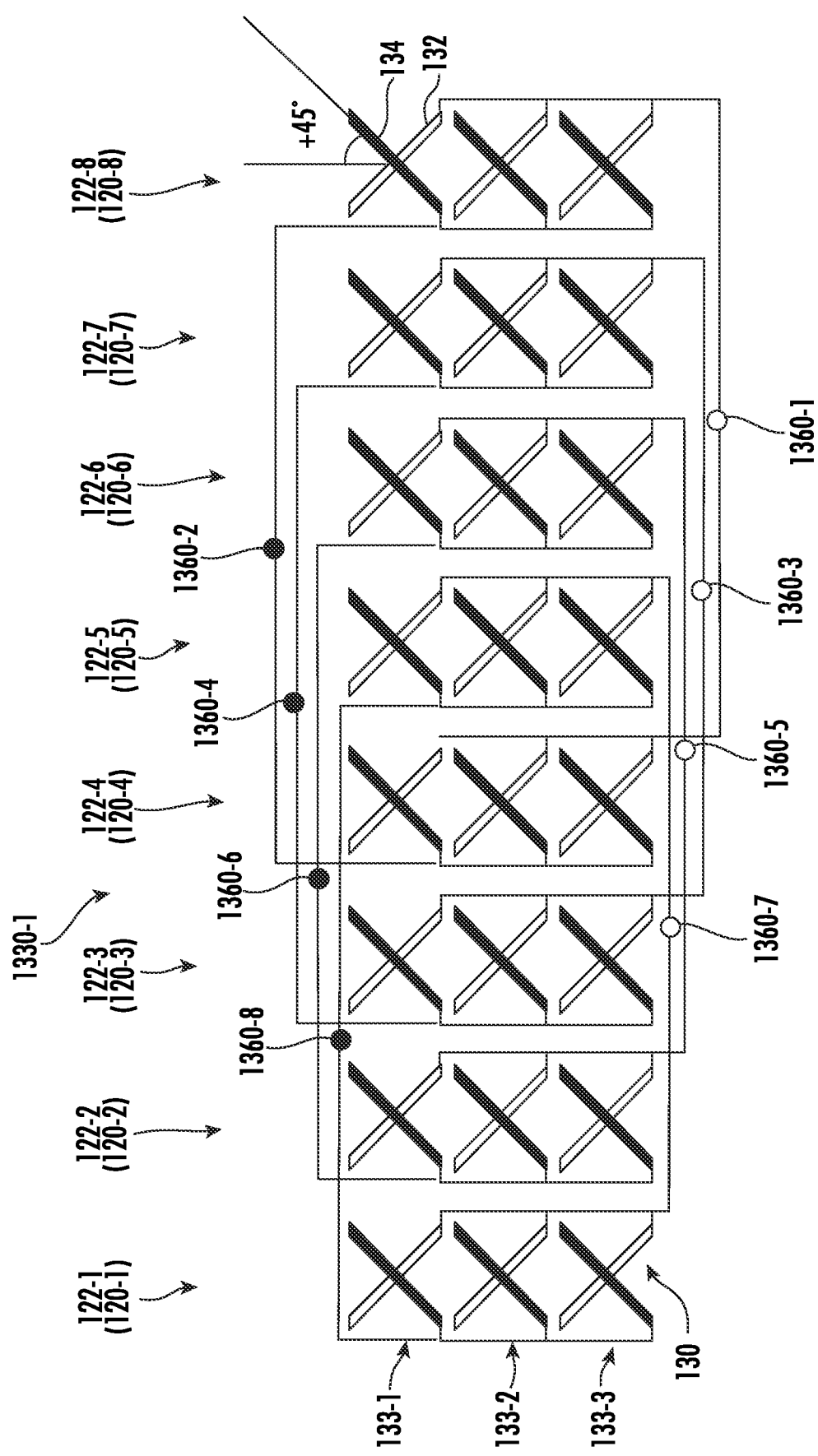
FIG. 13C is an enlarged schematic diagram illustrating a first of the rows of FIG. 13A.

FIG. 13C is an enlarged schematic diagram illustrating a first row 1330-1 of the rows 1330 of FIG. 13A. As shown in FIG. 13C, the row 1330-1 is coupled to four coupling elements 1360 per polarization. The coupling elements 1360 may comprise phase shifters, couplers, and/or splitters (e.g., power dividers). Four first-polarization coupling elements 1360-1, 1360-3, 1360-5, and 1360-7 may be part of the first-polarization portion 1350-1P (FIG. 13B) of the coupling circuit 1350 (FIG. 13A). Likewise, four second-polarization coupling elements 1360-2, 1360-4, 1360-6, and 1360-8 may be part of the second-polarization portion 1350-2P (FIG. 13B) of the coupling circuit 1350.

The row 1330-1 comprises three vertically-stacked sub-rows 133-1 through 133-3, each of which includes eight radiating elements 130 that are arranged in a horizontal direction. Each sub-column 122 (among eight sub-columns 122-1 through 122-8 that are in respective columns 120-1 through 120-8) includes a single radiating element 130 from each of the sub-rows 133-1 through 133-3. Moreover, each coupling element 1360 is coupled to two radiating elements 130 from each of the sub-rows 133-1 through 133-3. In some embodiments, center-to-center spacing between adjacent sub-rows 133 is about 58 mm, and center-to-center spacing between adjacent sub-columns 122 is about 41 mm.

FIG. 13C also shows that each radiating element 130 in the row 1330-1 may have −45° and +45° slant polarizations. For example, the dipole radiators 132 and 134 may be slant −45° and +45° radiators, respectively, of the radiating elements 130. The first-polarization coupling elements 1360-1, 1360-3, 1360-5, and 1360-7 may be coupled to the dipole radiators 132, and the second-polarization coupling elements 1360-2, 1360-4, 1360-6, and 1360-8 may be coupled to the dipole radiators 134.

Figure 13D:
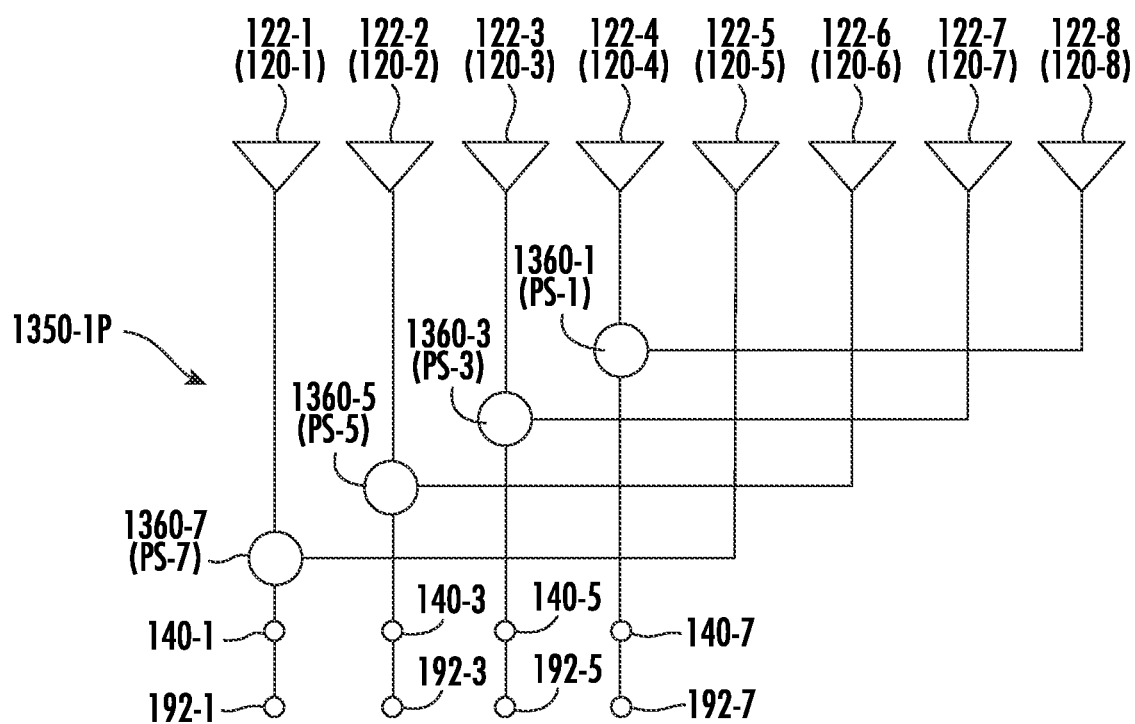
FIGS. 13D and 13E are schematic diagrams illustrating examples in which the coupling circuit of FIG. 13A includes a plurality of elements per polarization that are coupled between ports of the 32T32R radio of FIG. 13A and multiple columns of the antenna array of FIG. 13A.
Figure 13E:
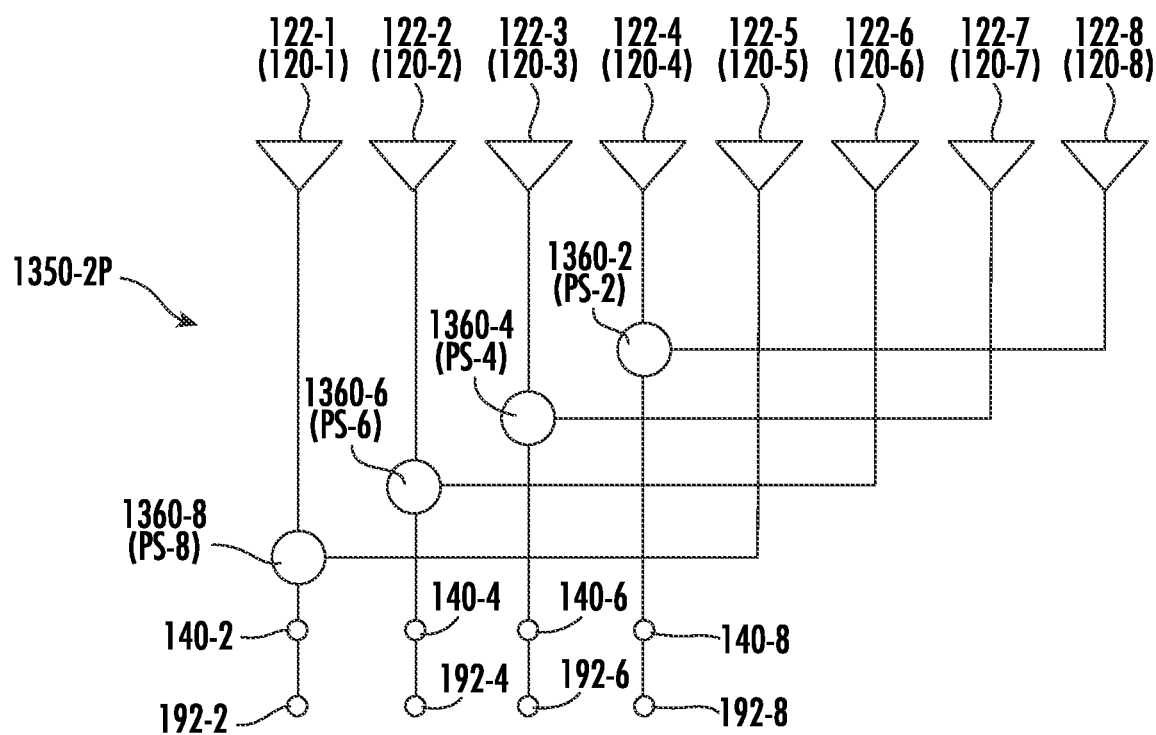

FIGS. 13D and 13E are schematic diagrams illustrating examples in which the coupling circuit 1350 of FIG. 13A includes a plurality of coupling elements 1360 per polarization that are coupled between radio signal ports 192 of the 32T32R radio of FIG. 13A and multiple sub-columns 122 of the antenna array 1313 of FIG. 13A.

As shown in FIG. 13D, the first-polarization portion 1350-1P of the coupling circuit 1350 includes the first-polarization coupling elements 1360-1, 1360-3, 1360-5, and 1360-7. The coupling element 1360-1 couples the radio signal port 192-7 to the sub-columns 122-4 and 122-8. The coupling element 1360-3 couples the radio signal port 192-5 to the sub-columns 122-3 and 122-7. The coupling element 1360-5 couples the radio signal port 192-3 to the sub-columns 122-2 and 122-6. The coupling element 1360-7 couples the radio signal port 192-1 to the sub-columns 122-1 and 122-5.

In some embodiments, the coupling elements 1360-1, 1360-3, 1360-5, and 1360-7 may be first-polarization phase shifters PS-1, PS-3, PS-5, and PS-7, respectively. Accordingly, each pair of sub-columns 122 can be combined by using a respective phase shifter PS. Each phase shifter PS may be, for example, a rotary wiper arc phase shifter, which can switch between multiple (e.g., two) beamsteering options. Without a phase shifter PS, beams may be steered in only four directions, with null points (which may occur when different radio waves of an antenna cancel each other out) therebetween. By contrast, using a phase shifter PS allows a beam to be steered in the azimuth plane to a null point and to provide maximum gain at that angle. As an example, the position of a phase shifter PS may be adjusted depending on the phase of a radio signal port 192 that is coupled thereto. Moreover, a phase shifter PS can, in some embodiments, help to control side lobes. Example phase shifters are discussed in U.S. Pat. No. 7,907,096, the disclosure of which is hereby incorporated herein by reference in its entirety.

Merely adjusting phasing of the radio 1190 (FIG. 13A) cannot cover null points. Phases of phase shifters PS, however, can be adjusted to cover the null points. In some embodiments, a beamforming system that controls remote electrical tilt ("RET") can automatically determine phase shifter PS phases. In other embodiments, a user can manually input phase shifter PS phases.

As shown in FIG. 13E, the second-polarization portion 1350-2P of the coupling circuit 1350 includes the second-polarization coupling elements 1360-2, 1360-4, 1360-6, and 1360-8. The coupling element 1360-2 couples the radio signal port 192-8 to the sub-columns 122-4 and 122-8. The coupling element 1360-4 couples the radio signal port 192-6 to the sub-columns 122-3 and 122-7. The coupling element 1360-6 couples the radio signal port 192-4 to the sub-columns 122-2 and 122-6. The coupling element 1360-8 couples the radio signal port 192-2 to the sub-columns 122-1 and 122-5. Moreover, the coupling elements 1360-2, 1360-4, 1360-6, and 1360-8 may, in some embodiments, be second-polarization phase shifters PS-2, PS-4, PS-6, and PS-8, respectively.

For simplicity of illustration, coupling elements 1360-1 through 1360-8 are shown in FIGS. 13C-13E for only the first row 1330-1 (FIG. 13C) of the rows 1330 (FIG. 13B). It will be understood, however, that each row 1330 may be coupled to four coupling elements 1360 (and thus four radio signal ports 192) per polarization. For example, eight sub-columns 122-9 through 120-16 (FIG. 13A) of a second row 1330-2 (FIG. 13B) may be coupled to first-polarization radio signal ports 192-9, 192-11, 192-13, and 192-15 (FIG. 13A) via four first-polarization coupling elements 1360 in a manner analogous to what is shown in FIG. 13D for the first row 1330-1. Likewise, the eight sub-columns 122-9 through 122-16 of the second row 1330-2 may be coupled to second-polarization radio signal ports 192-10, 192-12, 192-14, and 192-16 (FIG. 13A) via four second-polarization coupling elements 1360 in a manner analogous to what is shown in FIG. 13E for the first row 1330-1. A third row 1330-3 (FIG. 13B) comprising eight sub-columns 122-17 through 122-24 may be analogously coupled to first-polarization radio signal ports 192-17, 192-19, 192-21, and 192-23 (FIG. 13A) and to second-polarization radio signal ports 192-18, 192-20, 192-22, and 192-24 (FIG. 13A). And a fourth row 1330-4 (FIG. 13B) comprising eight sub-columns 122-25 through 122-32 may be analogously coupled to first-polarization radio signal ports 192-25, 192-27, 192-29, and 192-31 (FIG. 13A) and to second-polarization radio signal ports 192-26, 192-28, 192-30, and 192-32 (FIG. 13A).

Relative to a conventional 64T64R antenna system, the antenna system 1301 (FIG. 13A) may result in only a small performance degradation in the azimuth plane despite having half as many radio signal ports 192. Moreover, because each column 120 is coupled to four radio signal ports 192 (one radio signal port 192 per sub-column 122 in each column 120) per polarization in the elevation plane, the system 1301 can provide full beamforming in the elevation plane.

In some embodiments, each first-polarization radio signal port 192 in a row 1330 may have an equal share of power distribution that it provides to a pair of sub-columns 122. Likewise, each second-polarization radio signal port 192 in a row 1330 may have an equal share of power distribution that it provides to a pair of sub-columns 122. For example, power may be split equally (25% each) between the first-polarization radio signal ports 192-1, 192-3, 192-5, and 192-7 shown in FIG. 13D, and may be split equally (25% each) between the second-polarization radio signal ports 192-2, 192-4, 192-6, and 192-8 shown in FIG. 13E. As a result, full power from the radio 1190 (FIG. 13A) may be transmitted to the air. By contrast, in a conventional massive MIMO antenna system having columns that are fed by respective radio signal ports per polarization, outer columns of radiating elements may lose power due to amplitude taper and/or bad side lobes.

Moreover, phases of the radio signal ports 192 may vary based on the azimuth steering angle. For example, with an azimuth steering angle of 41.8°, the radio signal ports 192-1 and 192-7 may have phases of 157.5° and −157.5°, respectively, and the radio signal ports 192-3 and 192-5 may have phases of −67.5° and 67.5°, respectively. As another example, with an azimuth steering angle of −13°, the radio signal ports 192-1 and 192-7 may have phases of −67.5° and 67.5°, respectively, and the radio signal ports 192-3 and 192-5 may have phases of −22.5° and 22.5°, respectively. The total phase for a beam in the azimuth plane includes (a) the phase of the radio signal port 192, (b) fixed feed network phasing, and (c) phase shifter PS (FIGS. 13D and 13E) phasing (if any).

Figure 13F:
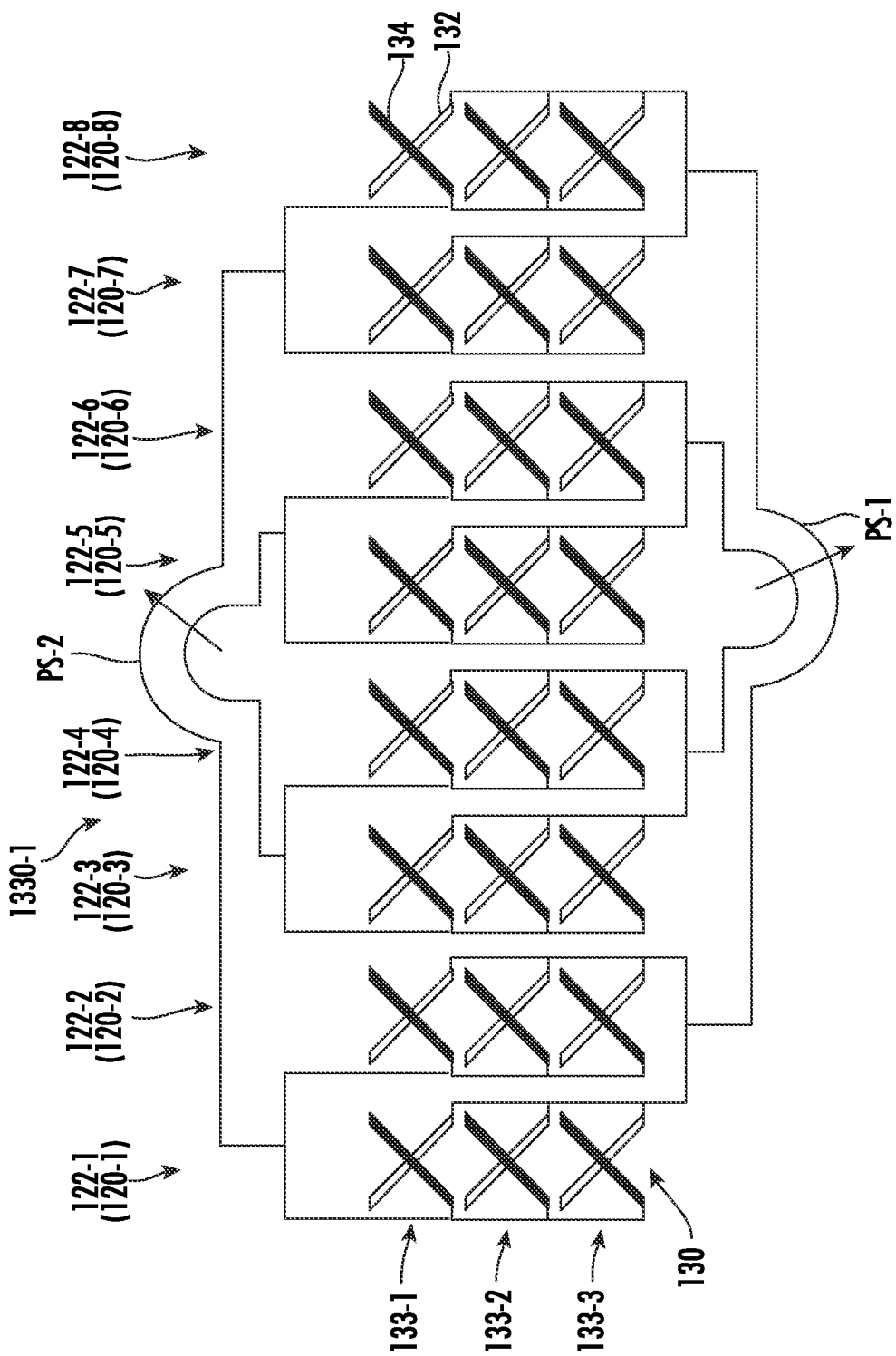
FIG. 13F is a schematic diagram illustrating a further example in which the coupling circuit of FIG. 13A includes a single phase shifter per polarization that is coupled to a first of the rows of FIG. 13A.

FIG. 13F is a schematic diagram illustrating a further example in which the coupling circuit 1350 of FIG. 13A includes a single phase shifter PS per polarization that is coupled to the first row 1330-1. A first-polarization phase shifter PS-1 is coupled to first dipole radiators 132 of each of the eight sub-columns 122-1 through 122-8 that are in the first row 1330-1. A second-polarization phase shifter PS-2 is coupled to second dipole radiators 134 of each of the eight sub-columns 122-1 through 122-8. Unlike what is shown in FIG. 13D, the single phase shifter PS-1 in FIG. 13F may couple a single first-polarization radio signal port 192-1 (FIG. 13D) to all eight of the sub-columns 122-1 through 122-8. Likewise, unlike what is shown in FIG. 13E, the single phase shifter PS-2 in FIG. 13F may couple a single second-polarization radio signal port 192-2 (FIG. 13E) to all eight of the sub-columns 122-1 through 122-8.

Using a single phase shifter PS per polarization can result in all of the columns 120 having equal power. For example, a 1:2 wiper-type phase shifter PS may provide a −3 dB power distribution to both its left and right branches. The use of a single phase shifter PS per polarization can be more cost-effective than using multiple phase shifters PS per polarization. Though the use of a single phase shifter PS per polarization can somewhat limit azimuth beamsteering because only one radio is connected to the columns 120, full digital beamforming can still be provided in the elevation plane as long as the antenna system includes two or more rows 1330.

For simplicity of illustration, the second through fourth rows 1330-2 through 1330-4 are omitted from view in FIG. 13F. It will be understood, however, that each of the rows 1330 (FIG. 13A) may be coupled to only one radio signal port 192 per polarization by using a single phase shifter PS per polarization rather than four phase shifters PS per polarization. Accordingly, the four rows 1330-1 through 1330-4 may be coupled to an 8T8R radio 290 (FIG. 2A) instead of the 32T32R radio 1190 (FIG. 13A).

Figure 13G:
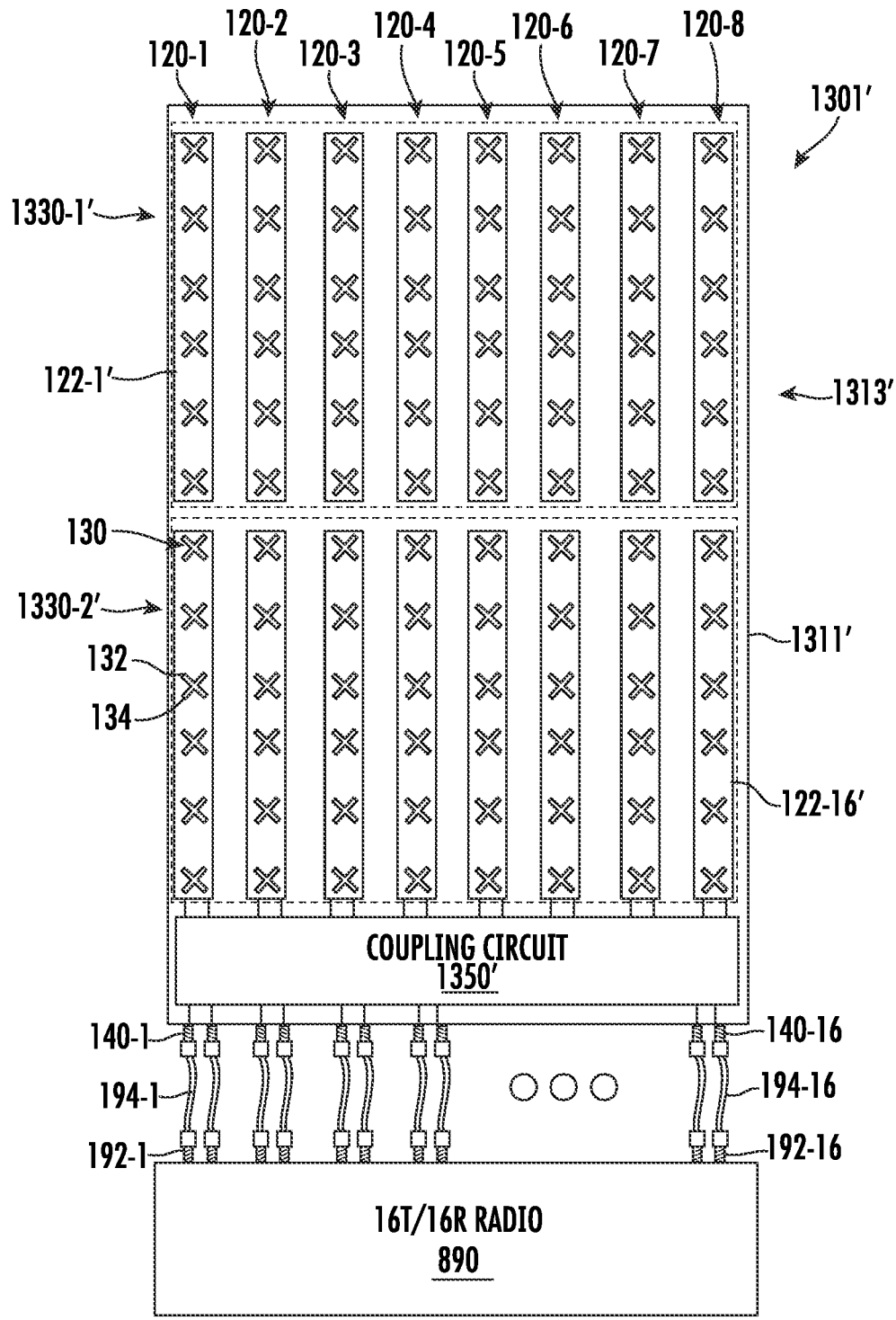
FIG. 13G is a schematic front view of a massive MIMO antenna system that is modified relative to the system of FIG. 13A to provide two rows.

FIG. 13G is a schematic front view of a massive MIMO antenna system 1301' that is modified relative to the antenna system 1301 of FIG. 13A to provide a total of two rows 1330-1' and 1330-2' instead of four rows 1330-1 through 1330-4. The system 1301' includes a 16T16R radio 890, a coupling circuit 1350', and an antenna 1311' having an antenna array 1313' that includes eight columns 120-1 through 120-8 and the two rows 1330-1' and 1330-2' of dual-polarized radiating elements 130. In particular, the two rows 1330-1' and 1330-2' each include eight sub-columns 122' of exactly six radiating elements 130. Each of the two rows 1330-1' and 1330-2' is thus a sub-array comprising forty-eight radiating elements 130, where the first row 1330-1' includes eight sub-columns 122-1' through 122-8' and the second row 1330-2' includes eight sub-columns 122-9' through 122-16'. Pairs of the sub-columns 122' may be coupled to each other by the coupling circuit 1350' in a manner similar to what is shown in FIGS. 13D and 13E.

Figure 13H:
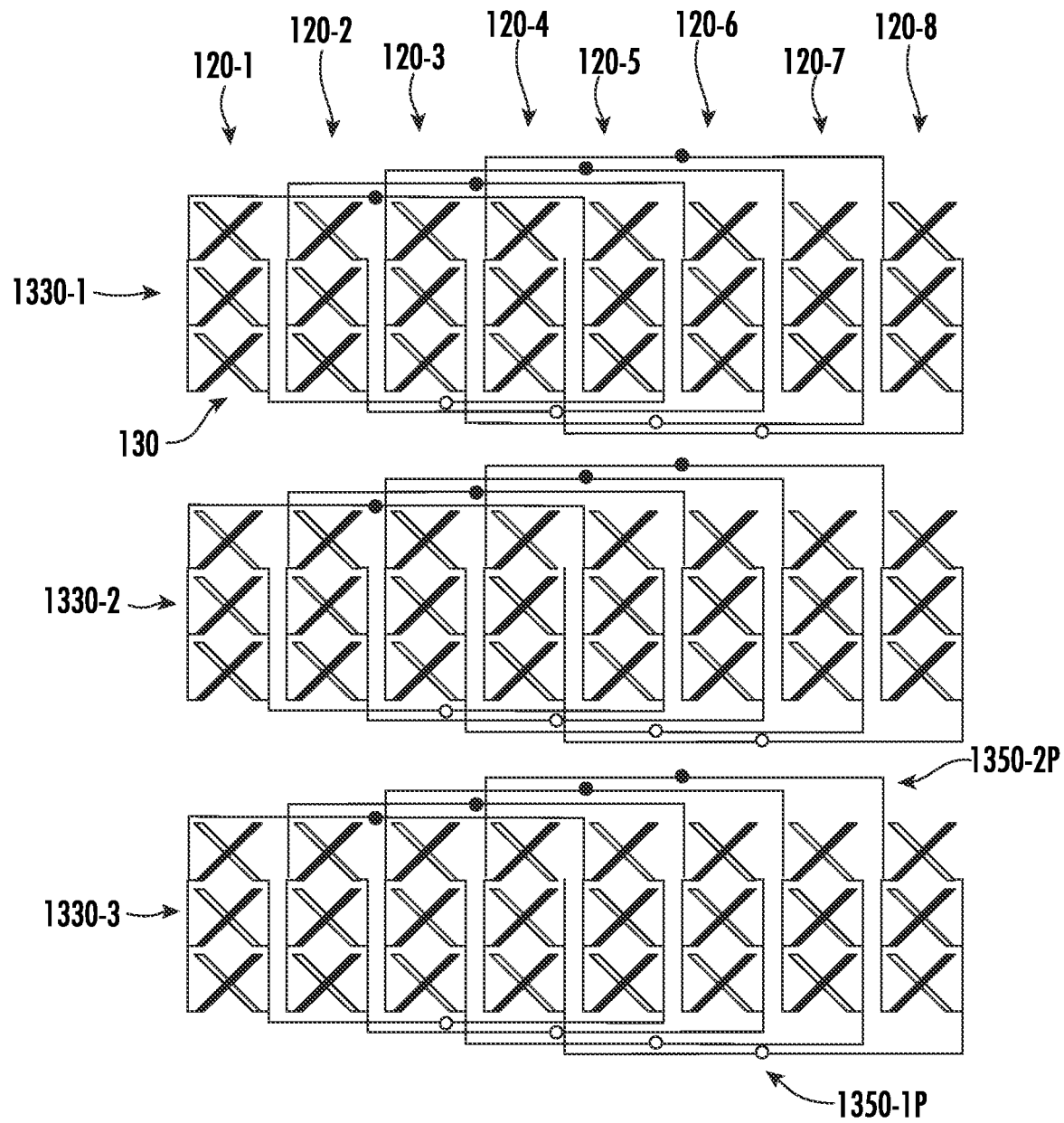
FIGS. 13H and 13I are schematic diagrams that are modified relative to the diagram of FIG. 13B to provide three rows and two rows, respectively.
Figure 13I:
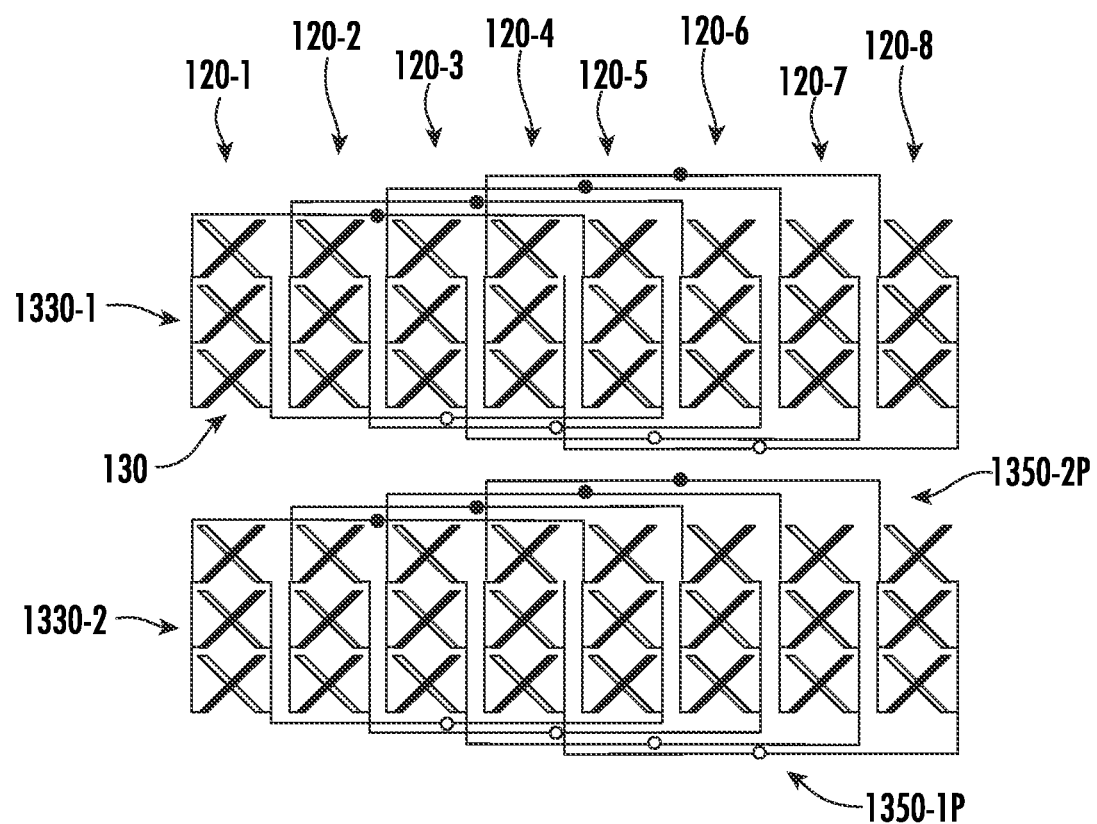

FIGS. 13H and 13I are schematic diagrams that are modified relative to the diagram of FIG. 13B to provide totals of three rows 1330-1 through 1330-3 and two rows 1330-1 and 1330-2, respectively. The antenna system 1301 of FIG. 13A can thus be modified to reduce the number of rows 1330. Eliminating one of the rows 1330 can reduce the number of radio signal ports 192 (FIG. 13A), as well as the number of coupling elements 1360 (FIG. 13C), by eight. Moreover, eliminating two of the rows 1330 can reduce the number of radio signal ports 192 (and the number of coupling elements 1360) by sixteen.

Each radio signal port 192 that is coupled to one of the three rows 1330-1 through 1330-3 of FIG. 13H is, by definition, coupled to one-third of the rows 1330-1 through 1330-3. Similarly, each radio signal port 192 that is coupled to one of the two rows 1330-1 and 1330-2 of FIG. 13I is, by definition, coupled to half of the rows 1330-1 and 1330-2. Referring again to FIG. 13G, each radio signal port 192 that is coupled to one of the two rows 1330-1' and 1330-2' is, by definition, coupled to half of the rows 1330-1' and 1330-2'. Moreover, referring again to FIGS. 13A-13E, each radio signal port 192 that is coupled to one of the four rows 1330-1 through 1330-4 is, by definition, coupled to one-quarter of the rows 1330-1 through 1330-4. Accordingly, various embodiments provide radio signal ports 192 that are each coupled to at least two columns 120 and no more than half of the rows 1330.

Referring again to FIG. 13I, the two rows 1330-1 and 1330-2 provide a 16T16R design that may have the same (or almost the same) elevation plane beams as a conventional 32T32R design. Moreover, the three rows 1330-1 through 1330-3 of FIG. 13H provide a 24T24R design that has better elevation plane steering range/beam shaping compared to the two rows 1330-1 and 1330-2 of FIG. 13I.

Antenna systems that include the rows 1330 shown in FIGS. 13A through 13I can perform digital beamforming in both azimuth and elevation planes. Conventional antenna systems, by contrast, may provide digital beamforming only in the azimuth plane and not in the elevation plane. Antenna systems that include the rows 1330 may have full digital beamsteering capability. In some embodiments, a first portion of beamsteering may be performed digitally and a second portion of beamsteering may be performed by passive Butler matrix hardware (e.g., couplers, power dividers, phase shifters, etc.). According to some embodiments, beamforming may be (i) fully digital in the elevation plane and (ii) a combination of digital and passive in the azimuth plane. In other embodiments, beamforming may be (a) fully digital in the azimuth plane and (b) a combination of digital and passive in the elevation plane.

Moreover, by adding rows 1330, performance (e.g., beam quality) in the elevation plane can be increased. The rows 1330 may thus be referred to herein as "modular" because rows 1330 can be added or subtracted to provide different levels of MIMO, such as 16T16R (two rows 1330), 24T24R (three rows 1330), 32T32R (four rows 1330), 40T40R (five rows 1330), or 48T48R (six rows 1330), with full beamforming. The four-row 1330 (32T32R) design can perform similarly to a conventional 64T64R MIMO product despite having half as many radio signal ports 192. Moreover, the five-row 1330 (40T40R) design can provide better elevation plane steering range/beam shaping compared to the four-row 1330 design. The six-row 1330 (48T48R) design can, likewise, provide better elevation plane steering range/beam shaping compared to the five-row 1330 design. Modularity can provide flexibility to design antenna systems to meet different performance requirements, such as large gain or low side lobes.

Antenna systems according to embodiments of the present invention may provide a number of advantages. For example, referring to FIGS. 2A and 3A, analog RF circuitry, such as a coupling circuit 250 or 350, can allow multiple columns 120 to share an RF signal that is output by a single port 192 of an 8T8R radio 290. The analog RF circuitry may be inside an antenna 210 (FIG. 2A) or 310 (FIG. 3A) or may be in a standalone device that is coupled between the radio 290 and the antenna 210 or 310.

By contrast with a conventional antenna 110 (FIG. 1A) that has only four columns 120 (FIG. 1A) coupled to an 8T8R radio 190 (FIG. 1A), the antenna 210 or 310 may have at least six columns 120 that are fed by the 8T8R radio 290 via the analog RF circuitry. The antenna 210 or 310 can thus provide higher gain and higher capacity/throughput than the antenna 110. As an example, the antenna 210 or 310 can provide significantly better azimuth patterns/directivity than the antenna 110, and therefore can improve network capacity. An antenna system 200 or 300 having the radio 290 may also be significantly less expensive than a conventional antenna system having a 16T16R radio. In addition to reducing cost, a smaller radio has fewer components, and thus takes up less space, has a lighter weight, and demands less power and cooling.

In some embodiments, beamforming radios are not limited to feeding at least six columns 120. Rather, as shown in the example of FIG. 6A, an 8T8R radio 690 uses no more than six ports 192 (three per polarization) to feed five columns 120. As another example, a beamforming radio may use no more than eight ports 192 (four per polarization) to feed five columns 120. Accordingly, beamforming radios of the present invention may be coupled to at least five columns 120, where the total number of columns 120 fed by a given beamforming radio may be larger than the radio's total number of ports 192 per polarization that are coupled the columns 120.

While embodiments of the present invention have been described above with reference to coupling circuits that split RF signals into first and second sub-components and feed these sub-components to first and second columns of radiating elements of an antenna array, it will be appreciated that embodiments of the present invention are not limited thereto. In particular, in other embodiments, 1-to-3, 1-to-4, 1-to-5 couplers and/or splitters and the like may be used to split an RF signal into more than two sub-components and to feed those sub-components to respective columns of an antenna array.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna system comprising:
  a beamforming radio having a plurality of radio signal ports including first and second radio signal ports; and
  an antenna array including rows and columns of dual-polarized radiating elements, wherein the antenna array has a vertical stack of sub-arrays, wherein each sub-array comprises at least one row of the dual-polarized radiating elements of the antenna array, wherein each sub-array comprises a plurality of sub-columns of dual-polarized radiating elements, and wherein each sub-column comprises at least one respective dual-polarized radiating element of a column,
  wherein the first radio signal port is coupled to first and second sub-columns of a first of the sub-arrays, and wherein the first radio signal port is free of coupling with a third sub-column of the first of the sub-arrays that is between the first and second sub-columns of the first of the sub-arrays, and
  wherein the second radio signal port is coupled to first and second sub-columns of a second of the sub-arrays, and wherein the radio signal port is free of coupling with a third sub-column of the second of the sub-arrays that is between the first and second sub-columns of the second of the sub-arrays.

2. The base station antenna system of claim 1, wherein the first of the sub-arrays comprises three rows of the dual-polarized radiating elements of the array, wherein each of the two first and second sub-columns of the first of the sub-arrays comprises three of the dual-polarized radiating elements of a respective column, and wherein the first radio signal port is coupled to the three dual-polarized radiating elements of the first of the sub-columns of the first sub-array and to the three dual-polarized radiating elements of the second of the sub-columns of the first sub-array.

3. The base station antenna system of claim 1, wherein each of the radio signal ports is coupled to six of the dual-polarized radiating elements.

4. The base station antenna system of claim 1, wherein the first and the second of the sub-arrays are each coupled to four of the radio signal ports per polarization.

5. The base station antenna system of claim 1, wherein a third of the radio signal ports is coupled to two sub-columns of a third of the sub-arrays.

6. The base station antenna system of claim 5, wherein a fourth of the radio signal ports is coupled to two sub-columns of a fourth of the sub-arrays.

7. The base station antenna system of claim 1, wherein the first of the sub-arrays comprises six rows of the dual-polarized radiating elements of the array, wherein each of the first and second sub-columns of the first of the sub-arrays comprises six of the dual-polarized radiating elements of a respective column, and wherein the first of the radio signal ports is coupled to the six dual-polarized radiating elements of the first of the sub-columns of the first sub-array and to the six dual-polarized radiating elements of the second of the sub-columns of the first sub-array.

8. The base station antenna system of claim 1, further comprising:
a plurality of first phase shifters per polarization that are coupled to the first of the sub-arrays; and
a plurality of second phase shifters per polarization that are coupled to the second of the sub-arrays.

9. The base station antenna system of claim 1, further comprising:
a single first phase shifter per polarization that is coupled to every sub-column of the first of the sub-arrays; and
a single second phase shifter per polarization that is coupled to every sub-column of the second of the sub-arrays.

10. The base station antenna system of claim 1, wherein the first sub-column of the first sub-array and the first sub-column of the second sub-array are included in a first column of the antenna array, wherein the second sub-column of the first sub-array and the second sub-column of the second sub-array are included in a second column of the antenna array, and wherein the third sub-column of the first sub-array and the third sub-column of the second sub-array are included in a third column of the antenna array.

11. A base station antenna system comprising:
a beamforming radio having a plurality of radio signal ports;
an antenna array having a vertical stack of sub-arrays that each comprise a plurality of sub-columns of dual-polarized radiating elements,
wherein a first of the radio signal ports is coupled to two sub-columns of a first of the sub-arrays, and
wherein a second of the radio signal ports is coupled to two sub-columns of a second of the sub-arrays;
a plurality of first phase shifters per polarization that are coupled to the first of the sub-arrays; and
a plurality of second phase shifters per polarization that are coupled to the second of the sub-arrays,
wherein the first of the radio signal ports is coupled to the two sub-columns of the first of the sub-arrays via a first of the first phase shifters, and
wherein the second of the radio signal ports is coupled to the two sub-columns of the second of the sub-arrays via a first of the second phase shifters.

12. The base station antenna system of claim 11,
wherein the first of the sub-arrays is coupled to four of the first phase shifters per polarization, and
wherein the second of the sub-arrays is coupled to four of the second phase shifters per polarization.

13. A massive MIMO base station antenna system comprising:
an antenna array having a plurality of radiating elements;
a beamforming radio having fewer than sixty-four radio signal ports that are coupled to the antenna array; and
a coupling circuit that couples a first of the radio signal ports to at least two sub-columns of the radiating elements,
wherein the beamforming radio comprises a 32T32R beamforming radio.

14. The massive MIMO base station antenna system of claim 13, wherein each sub-column includes exactly two radiating elements or exactly one radiating element.

15. The massive MIMO base station antenna system of claim 13,
wherein each sub-column includes exactly three radiating elements, and
wherein the antenna array has eight columns and four rows of the sub-columns.

16. The massive MIMO base station antenna system of claim 13, wherein a sub-array of the antenna array includes eight of the sub-columns.

17. The massive MIMO base station antenna system of claim 13, wherein the coupling circuit comprises a phase shifter.

18. A base station antenna system comprising:
a beamforming radio having a plurality of radio signal ports including first and second radio signal ports; and
an antenna array of radiating elements having a plurality of rows of radiating elements and a plurality of columns of radiating elements including first, second, third, and fourth columns of radiating elements, wherein the second column of radiating elements is between the first and third columns of radiating elements, and wherein the third column of radiating elements is between the second and fourth columns of radiating elements,
wherein the first radio signal port is coupled to at least one radiating element in the first column and to at least one radiating element in the third column, wherein the first radio signal port is coupled to no more than half of the radiating elements in the first column and to no more than half of the radiating elements in the third column, and wherein the first radio signal port is free of coupling with radiating elements of the second column, and
wherein the second radio signal port is coupled to at least one radiating element in the second column and to at least one radiating element in the fourth column, and wherein the second radio signal port is coupled to no more than half of the radiating elements of the second column and to no more than half of the radiating elements of the fourth column.

19. The base station antenna system of claim 18,
wherein each of the rows is coupled to four of the radio signal ports per polarization, and
wherein each of the columns respectively comprises four sub-columns that are coupled to four of the radio signal ports, respectively, per polarization.

20. The base station antenna system of claim 18, wherein each of the radio signal ports is coupled to one-quarter or one-third of the radiating elements in a respective column.

21. The base station antenna system of claim 18,
wherein the first radio signal port is coupled with a plurality of radiating elements in the first column and to a plurality of radiating elements in the third column,
wherein the second radio signal is coupled with a plurality of radiating elements in the second column and to a plurality of radiating elements in the fourth column, wherein a total number of the plurality of radiating elements in the first column coupled to the first radio signal port is equal to a total number of the plurality of radiating elements in the third column coupled to the first radio signal port, wherein a total number of the plurality of radiating elements in the second column coupled to the second radio signal port is equal to a total number of the plurality of radiating elements in the fourth column coupled to the second radio signal port, wherein the plurality of radiating elements in the first column coupled to the first radio signal port are consecutive radiating elements, wherein the plurality of radiating elements in the second column coupled to the second radio signal port are consecutive radiating elements, wherein the plurality of radiating elements in the third column coupled to the first radio signal port are consecutive radiating elements, and wherein the plurality of radiating elements in the fourth column coupled to the second radio signal port are consecutive radiating elements, wherein a first row of the plurality of rows includes a first radiating element of the radiating elements in the first column coupled to the first radio signal port and a first radiating element of the radiating elements in the third column coupled to the first radio signal port, and wherein a second row of the plurality of rows includes a first radiating element of the radiating elements in the second column coupled to the second radio signal port and a first radiating element of the radiating elements in the fourth column coupled to the second radio signal port.

22. The base station antenna system of claim 21, wherein the first row of the plurality of rows includes a second radiating element of the radiating elements in the second column coupled to the second radio signal port and a second radiating element of the radiating elements in the fourth column coupled to the second radio signal port, wherein the second row of the plurality of rows includes a second radiating element of the radiating elements in the first column coupled to the first radio signal port and a second radiating element of the radiating elements in the third column coupled to the first radio signal port, and wherein the first and second rows are adjacent rows.

23. A base station antenna system comprising:

a beamforming radio having X radio signal ports; and an antenna array including Y columns of dual-polarized radiating elements, wherein each radio signal port is coupled to at least two and fewer than all of the columns of dual-polarized radiating elements, and wherein X<2*Y.

24. The base station antenna system of claim 23, wherein X=Y.

25. The base station antenna system of claim 23, wherein each radio signal port is coupled to a non-adjacent pair of columns from among the columns of dual-polarized radiating elements.

* * * * *

UNITED STATES PATENT AND TRADEMARK OFFICE
CERTIFICATE OF CORRECTION

PATENT NO. : 11,894,892 B2
APPLICATION NO. : 17/567934
DATED : February 6, 2024
INVENTOR(S) : Junttila et al.

Page 1 of 1

It is certified that error appears in the above-identified patent and that said Letters Patent is hereby corrected as shown below:

In the Specification

Column 30, Line 55: Please correct "the two first" to read --the first--

Signed and Sealed this
Twenty-third Day of April, 2024

*Katherine Kelly Vidal*

Katherine Kelly Vidal
*Director of the United States Patent and Trademark Office*